(12) United States Patent
Yang et al.

(10) Patent No.: US 12,160,388 B2
(45) Date of Patent: Dec. 3, 2024

(54) METHOD AND APPARATUS FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Suckchel Yang, Seoul (KR); Seonwook Kim, Seoul (KR); Hanjun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 729 days.

(21) Appl. No.: 17/265,500

(22) PCT Filed: Aug. 9, 2019

(86) PCT No.: PCT/KR2019/010053
§ 371 (c)(1),
(2) Date: Feb. 2, 2021

(87) PCT Pub. No.: WO2020/032670
PCT Pub. Date: Feb. 13, 2020

(65) Prior Publication Data
US 2021/0297223 A1    Sep. 23, 2021

Related U.S. Application Data
(60) Provisional application No. 62/716,978, filed on Aug. 9, 2018.

(30) Foreign Application Priority Data
Jan. 11, 2019 (KR) .......................... 10-2019-0004181
Jan. 24, 2019 (KR) .......................... 10-2019-0009388
(Continued)

(51) Int. Cl.
*H04L 5/00* (2006.01)
(52) U.S. Cl.
CPC .................................. *H04L 5/0055* (2013.01)
(58) Field of Classification Search
None
See application file for complete search history.

(56) References Cited

U.S. PATENT DOCUMENTS

2012/0134276 A1    5/2012   He et al.
2015/0103775 A1*   4/2015   Zhu ...................... H04L 1/1812
                                                                    370/329
(Continued)

FOREIGN PATENT DOCUMENTS

WO    2017085122    5/2017
WO    2018131880    7/2018
(Continued)

OTHER PUBLICATIONS

European Patent Office Application Serial No. 19846021.4, Search Report dated Jul. 30, 2021, 11 pages.
(Continued)

*Primary Examiner* — Adnan Baig
(74) *Attorney, Agent, or Firm* — LEE, HONG, DEGERMAN, KANG & WAIMEY

(57) ABSTRACT

The present invention relates to a wireless communication system and, specifically, to a method comprising the steps of: transmitting first A/N information; receiving one or more data after transmitting the first A/N information; receiving downlink control information including a 1-bit indicator; and transmitting second A/N information including an A/N result for the one or more data depending on whether the 1-bit indicator is toggled, and to an apparatus therefor, wherein the second A/N information is generated by reflecting only a data reception state after the transmission of the
(Continued)

first A/N information, on the basis of a case where the 1-bit indicator has been toggled; and the second A/N information is generated in consideration of (i) the first A/N information and (ii) the data reception state after the transmission of the first A/N information, on the basis of a case where the 1-bit indicator has not been toggled.

11 Claims, 20 Drawing Sheets

(30) Foreign Application Priority Data

Feb. 15, 2019 (KR) ........................ 10-2019-0017657
Mar. 29, 2019 (KR) ........................ 10-2019-0036829

(56) References Cited

U.S. PATENT DOCUMENTS

| | | | |
|---|---|---|---|
| 2017/0273056 A1 | 9/2017 | Papasakellariou | |
| 2018/0219654 A1* | 8/2018 | Chen | ........................ H04L 5/16 |
| 2020/0280400 A1* | 9/2020 | Li | ........................ H04L 1/1896 |
| 2021/0075556 A1* | 3/2021 | Karaki | ................. H04L 1/1819 |

FOREIGN PATENT DOCUMENTS

| | | |
|---|---|---|
| WO | 2019216800 | 11/2019 |
| WO | 2020025059 | 2/2020 |

OTHER PUBLICATIONS

Huawei et al., "Feature lead summary of HARQ enhancement in NR-U," R1-1809921, 3GPP TSG RAN WG1 Meeting #94, Aug. 2018, 7 pages.
PCT International Application No. PCT/KR2019/010053, International Search Report dated Dec. 4, 2019, 15 pages.
Samsung, "Harq enhancements for NR-U," R1-1806763, 3GPP TSG RAN WG1 Meeting #93, May 2018, 5 pages.
Ericsson, "Remaining issues for HARQ-ACK for MTC," R2-1807809, 3GPP TSG-RAN WG2#102, May 2018, 7 pages.
Qualcomm Incorporated, "On HARQ procedure upon skipping a UL transmission," R2-1808576, 3GPP TSG-RAN WG2 Meeting #102, May 2018, 5 pages.

* cited by examiner (a) Carrier aggregation between L-band and U-band (b) Standalone U-band(s)

(a) Intra-COT A/N (b) Inter-COT A/N (a) t-A/N without DAI signaling (b) t-A/N with DAI signaling

METHOD AND APPARATUS FOR TRANSMITTING AND RECEIVING WIRELESS SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2019/010053, filed on Aug. 9, 2019, which claims the benefit of U.S. Provisional Application No. 62/716,978, filed on Aug. 9, 2018, and also claims the benefit of earlier filing date and right of priority to Korean Application Nos. 10-2019-0004181 filed on Jan. 11, 2019, 10-2019-0009388 filed on Jan. 24, 2019, 10-2019-0017657 filed on Feb. 15, 2019, and 10-2019-0036829 filed on Mar. 29, 2019, the contents of which are all incorporated by reference herein in their entirety.

TECHNICAL FIELD

The present disclosure relates to a wireless communication system, and more particularly, to a method and apparatus for transmitting and receiving a wireless signal.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

Provided are a method and apparatus for efficiently performing a wireless signal transmission and reception process.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting a signal by a wireless device in a wireless communication system includes transmitting first acknowledgment/negative acknowledgment (A/N) information, receiving one or more data after the transmission of the first A/N information, receiving downlink control information including a 1-bit indicator, and transmitting second A/N information including an A/N result for the one or more data based on whether the 1-bit indicator has been toggled. Based on the 1-bit indicator having been toggled, the second A/N information is generated by reflecting only a data reception state after the transmission of the first A/N information, and based on the 1-bit indicator having not been toggled, the second A/N information is generated in consideration of both (i) the first A/N information and (ii) the data reception state after the transmission of the first A/N information.

In another aspect of the present disclosure, a communication apparatus used in a wireless communication system includes a memory and a processor. The processor is configured to transmit first A/N information, receive one or more data after the transmission of the first A/N information, receive downlink control information including a 1-bit indicator, and transmit second A/N information including an A/N result for the one or more data based on whether the 1-bit indicator has been toggled. Based on the 1-bit indicator having been toggled, the second A/N information is generated by reflecting only a data reception state after the transmission of the first A/N information, and based on the 1-bit indicator having not been toggled, the second A/N information is generated in consideration of both (i) the first A/N information and (ii) the data reception state after the transmission of the first A/N information.

The first A/N information may be transmitted according to a listen-to-talk (LBT) result.

Based on the 1-bit indicator having been toggled, remaining A/Ns except for an A/N for the one or more data may be set to NACK in the second A/N information.

Based on the 1-bit indicator having not been toggled, remaining A/Ns except for an A/N for the one or more data may be set to the same as the first A/N information in the second A/N information.

An A/N for the one or more data may be set to ACK or NACK in the second A/N information, based on a decoding result of each of the one or more data.

The first A/N information and the second A/N information may include a plurality of A/N results for the same hybrid automatic repeat request (HARQ) processor identity (ID) group.

The first A/N information and the second A/N information may include a plurality of A/N results for the same slot group.

The communication apparatus may include an autonomous driving vehicle communicable with at least one of a user equipment (UE), a network, or another autonomous driving vehicle other than the communication apparatus.

Advantageous Effects

According to the present disclosure, a wireless signal may be efficiently transmitted and received in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the present disclosure and together with the description serve to explain the principle of the present disclosure. In the drawings.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3$^{rd}$ generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

While the following description is given in the context of a 3GPP communication system (e.g., NR) for clarity, the technical spirit of the present disclosure is not limited to the 3GPP communication system.

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
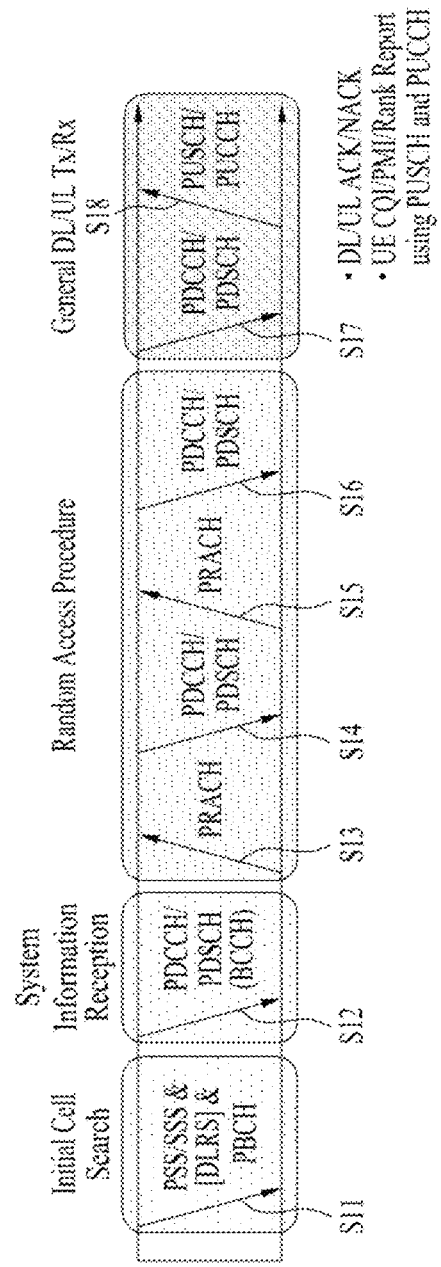
FIG. 1 illustrates physical channels and a general signal transmission method using the physical channels in a 3$^{rd}$ generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S101). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

Subsequently, to complete connection to the BS, the UE may perform a random access procedure with the BS (S103 to S106). Specifically, the UE may transmit a preamble on a physical random access channel (PRACH) (S103) and may receive a PDCCH and a random access response (RAR) for the preamble on a PDSCH corresponding to the PDCCH (S104). The UE may then transmit a physical uplink shared channel (PUSCH) by using scheduling information in the RAR (S105), and perform a contention resolution procedure including reception of a PDCCH and a PDSCH signal corresponding to the PDCCH (S106).

After the above procedure, the UE may receive a PDCCH and/or a PDSCH from the BS (S107) and transmit a physical uplink shared channel (PUSCH) and/or a physical uplink control channel (PUCCH) to the BS (S108), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
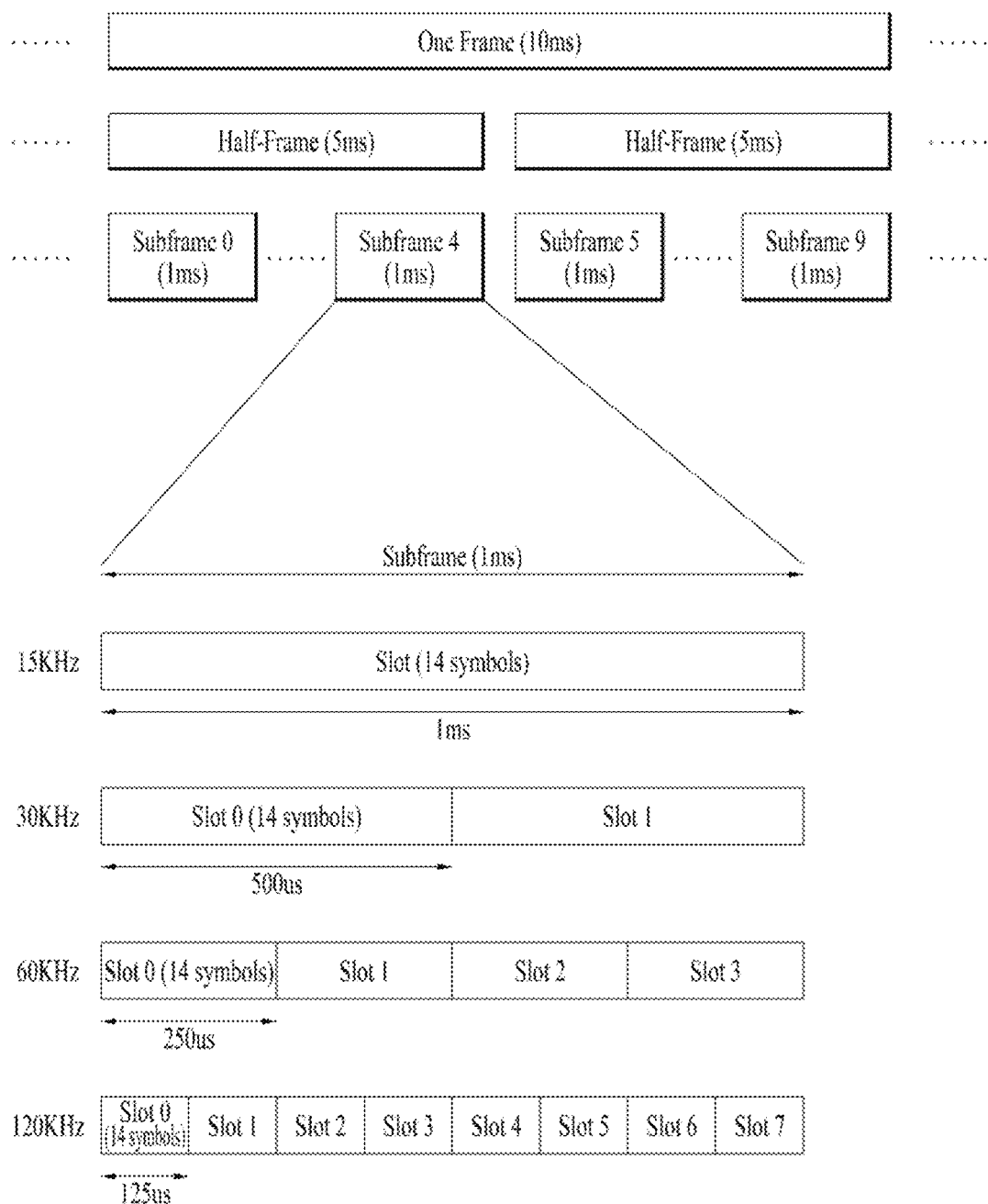
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14

OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u)   | $N^{slot}_{symb}$ | $N^{frame,u}_{slot}$ | $N^{subframe,u}_{slot}$ |
|----------------|-------------------|----------------------|-------------------------|
| 15 KHz (u = 0) | 14                | 10                   | 1                       |
| 30 KHz (u = 1) | 14                | 20                   | 2                       |
| 60 KHz (u = 2) | 14                | 40                   | 4                       |
| 120 KHz (u = 3)| 14                | 80                   | 8                       |
| 240 KHz (u = 4)| 14                | 160                  | 16                      |

$N^{slot}_{symb}$: number of symbols in a slot
$N^{frame,u}_{slot}$: number of slots in a frame
$N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u)   | $N^{slot}_{symb}$ | $N^{frame,u}_{slot}$ | $N^{subframe,u}_{slot}$ |
|----------------|-------------------|----------------------|-------------------------|
| 60 KHz (u = 2) | 12                | 40                   | 4                       |

The frame structure is merely an example, and the number of subframes, the number of slots, and the number of symbols in a frame may be changed in various manners.

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells. A symbol may include an OFDM symbol (or CP-OFDM symbol) and an SC-FDMA symbol (or discrete Fourier transform-spread-OFDM (DFT-s-OFDM) symbol).

Figure 3:
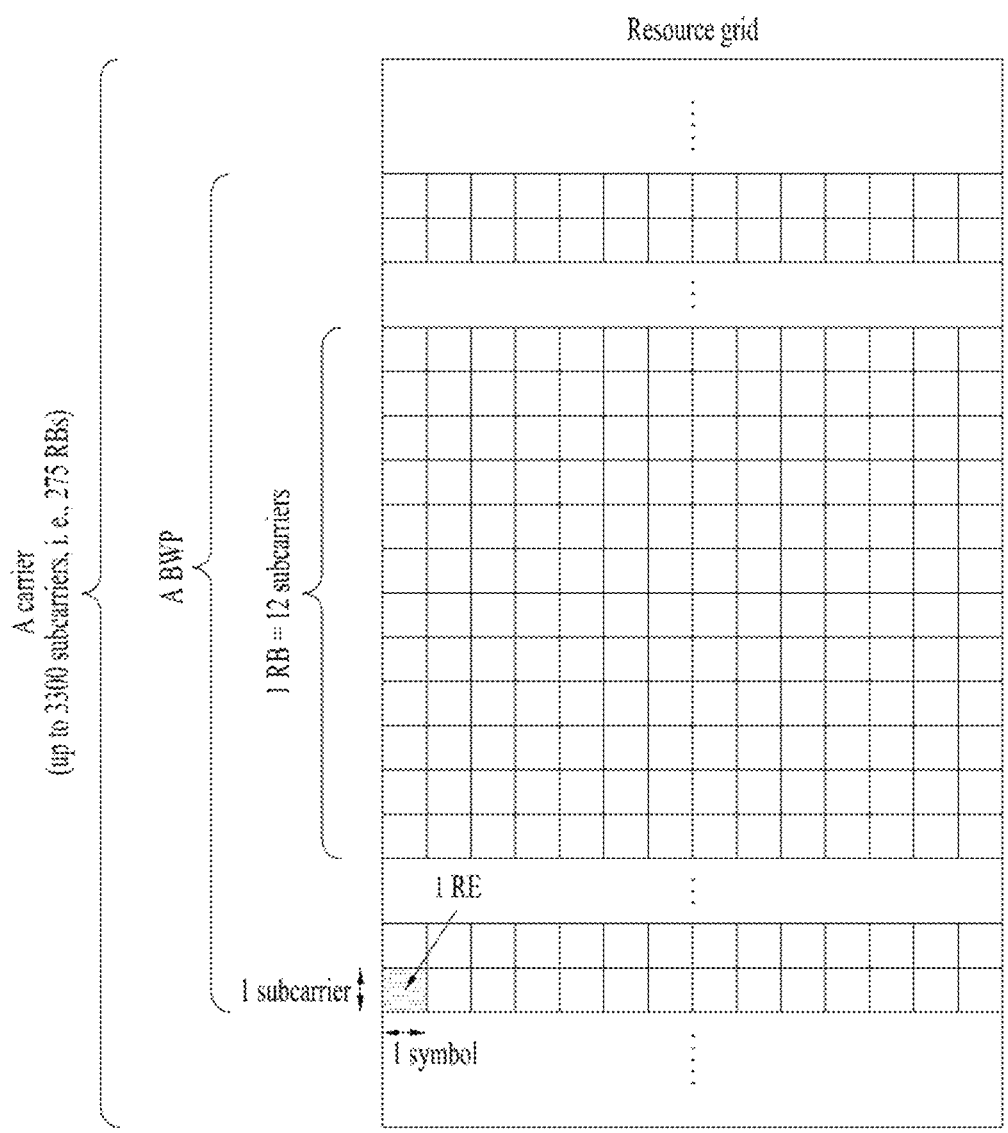
FIG. 3 illustrates a resource grid during the duration of a slot.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
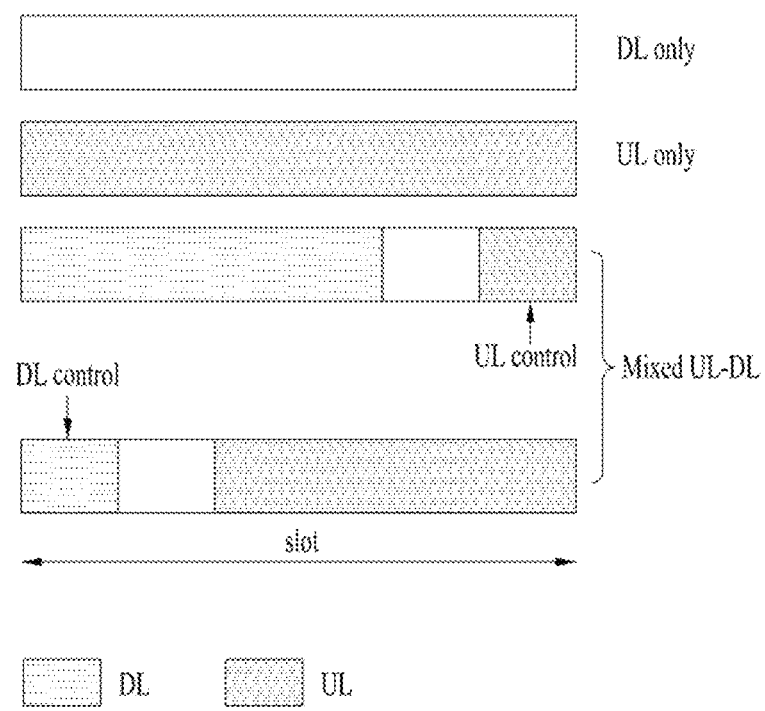
FIG. 4 illustrates a self-contained slot structure.
Figure 5:
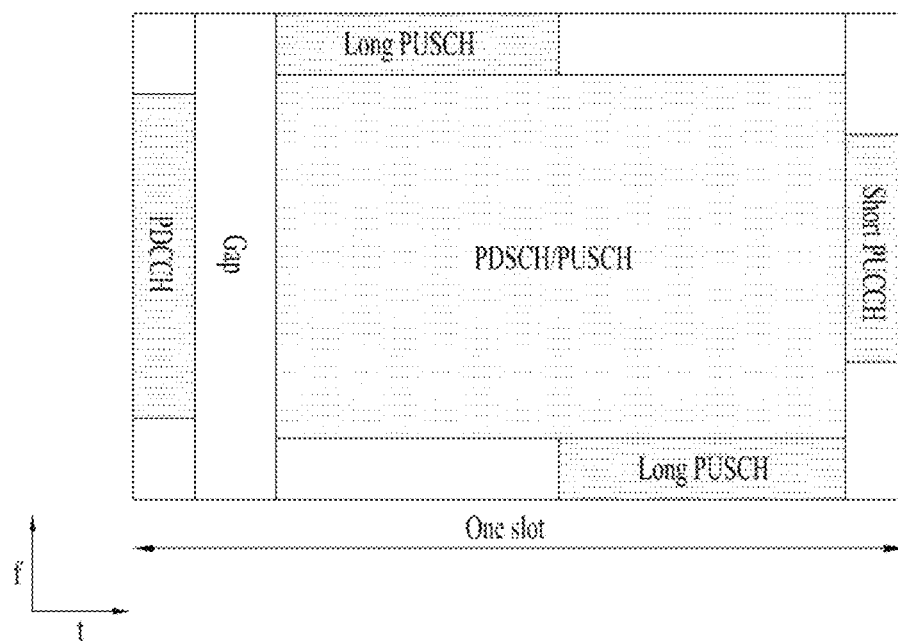
FIG. 5 illustrates mapping of physical channels in a self-contained slot.

FIG. 4 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.
1. DL only configuration
2. UL only configuration
3. Mixed UL-DL configuration
   DL region+Guard period (GP)+UL control region
   DL control region+GP+UL region
   DL region: (i) DL data region, (ii) DL control region+ DL data region
   UL region: (i) UL data region, (ii) UL data region+UL control region FIG. 5 illustrates mapping of physical channels in a self-contained slot. The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

Now, a detailed description will be given of physical channels.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH may include 1, 2, 4, 8, or 16 control channel elements (CCEs) depending on the aggregation level (AL). The CCE is a logical allocation unit for providing the PDCCH with a predetermined coding rate based on the state of a radio channel. The PDCCH is transmitted in a control resource set (CORESET). The CORESET is defined as a set of REGs with a given numerology (e.g., SCS, CP length, etc.). A plurality of CORESETs for one UE may overlap in the time/frequency domain. The CORESET may be configured by system information (e.g., master information block (MIB)) or UE-specific higher layer signaling (e.g., radio resource control (RRC) layer signaling). Specifically, the numbers of RBs and OFDM symbols (up to three OFDM symbols) in the CORESET may be configured by higher layer signaling.

To receive/detect the PDCCH, the UE monitors PDCCH candidates. A PDCCH candidate refers to CCE(s) that the UE should monitor for PDCCH detection. Each PDCCH candidate is defined by 1, 2, 4, 8, or 16 CCEs depending on the AL. Here, monitoring includes (blind) decoding of PDCCH candidates. A set of PDCCH candidates monitored by the UE are defined as a PDCCH search space (SS). The SS may include a common search space (CSS) or a UE-specific search space (USS). The UE may obtain DCI by monitoring PDCCH candidates in one or more SSs, which are configured by an MIB or higher layer signaling. Each CORESET is associated with one or more SSs, and each SS is associated with one CORESET. The SS may be defined based on the following parameters.

controlResourceSetId: this indicates the CORESET related to the SS.
monitoringSlotPeriodicityAndOffset: this indicates a PDCCH monitoring periodicity (on a slot basis) and a PDCCH monitoring period offset (on a slot basis).
monitoringSymbolsWithinSlot: this indicates PDCCH monitoring symbols in a slot (e.g., first symbol(s) in the CORESET).
nrofCandidates: this denotes the number of PDCCH candidates for each AL={1, 2, 4, 8, 16} (one of 0, 1, 2, 3, 4, 5, 6, and 8).
An occasion (e.g., time/frequency resource) for monitoring PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 01 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 11 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 11 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH delivers DL data (e.g., a downlink shared channel (DL-SCH) transport block (TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

The PUCCH delivers uplink control information (UCI). The UCI includes the following information.

SR: information used to request UL-SCH resources.
HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term "HARQ-ACK is interchangeably used with HARQ ACK/NACK and ACK/NACK.
CSI: feedback information for a DL channel. Multiple input multiple output (MIMO)-related feedback information includes an RI and a PMI.

Table 5 illustrates exemplary PUCCH formats. PUCCH formats may be divided into short PUCCHs (Formats 0 and 2) and long PUCCHs (Formats 1, 3, and 4) based on PUCCH transmission durations. D T

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| | 4-14 | ≤2 | HARQ, [SR] | Sequence modulation |
| 2 | 1-2 | >2 | HARQ, CSI, [SR] | CP-OFDM |

TABLE 5-continued

| PUCCH format | Length in OFDM symbols $N_{symb}^{PUCCH}$ | Number of bits | Usage | Etc |
|---|---|---|---|---|
| 3 | 4-14 | >2 | HARQ, CSI, [SR] | DFT-s-OFDM (no UE multiplexing) |
| 4 | 4 14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of 1/3. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Figure 6:
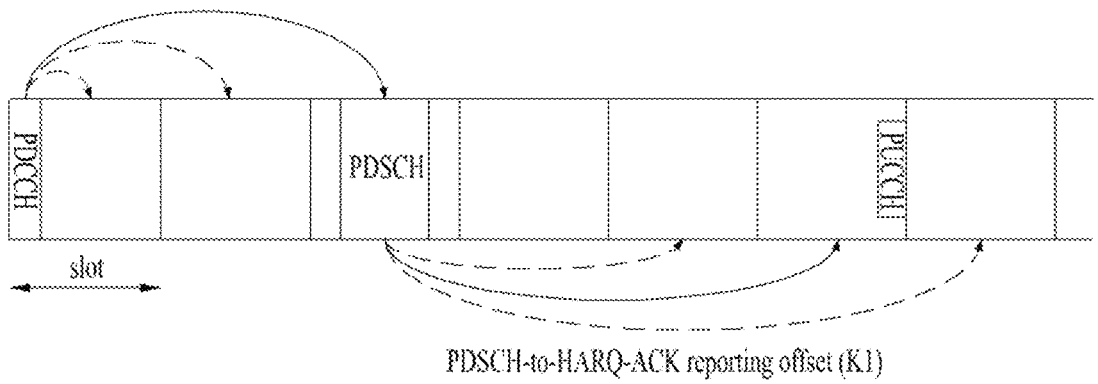
FIG. 6 illustrates an acknowledgment/negative acknowledgment (ACK/NACK) transmission process.

FIG. 6 illustrates an ACK/NACK transmission process. Referring to FIG. 6, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-HARQ-ACK reporting offset, K1. For example, DCI format 1_0 or DCI format 1_1 may include the following information.

Frequency domain resource assignment: Indicates an RB set assigned to the PDSCH.

Time domain resource assignment: Indicates K0 and the starting position (e.g. OFDM symbol index) and length (e.g. the number of OFDM symbols) of the PDSCH in a slot.

PDSCH-to-HARQ_feedback timing indicator: Indicates K1.

HARQ process number (4 bits): Indicates the HARQ process identity (ID) of data (e.g., a PDSCH or a TB).

After receiving the PDSCH in slot #(n+K0) according to the scheduling information of slot #n, the UE may transmit UCI on the PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

There are a plurality of parallel DL HARQ processes for DL transmissions in a BS/UE. In the plurality of parallel HARQ processes, DL transmissions are continuously performed, while an HARQ feedback indicating successful or failed reception of a previous DL transmission is awaited. Each DL HARQ process manages state variables related to the transmission number of MAC protocol data units (PDUs) in a buffer, an HARQ feedback for a MAC PDU in the buffer, a current redundancy version, and so on. Each HARQ process is identified by an HARQ process ID.

Figure 7:
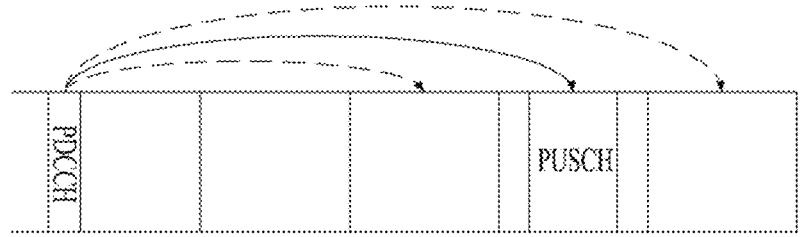
FIG. 7 illustrates a physical uplink shared channel (PUSCH) transmission process.

FIG. 7 illustrates an exemplary PUSCH transmission process. Referring to FIG. 7, a UE may detect a PDCCH in slot #n. The PDCCH may include UL scheduling information (e.g., DCI format 0_0 or DCI format 01). DCI format 0_0 and DCI format 0_1 may include the following information.

Frequency domain resource assignment: Indicates an RB set allocated to a PUSCH.

Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit the PUSCH in slot #(n+K2) according to the scheduling information in slot #n. The PUSCH includes a UL-SCH TB.

Figure 8:
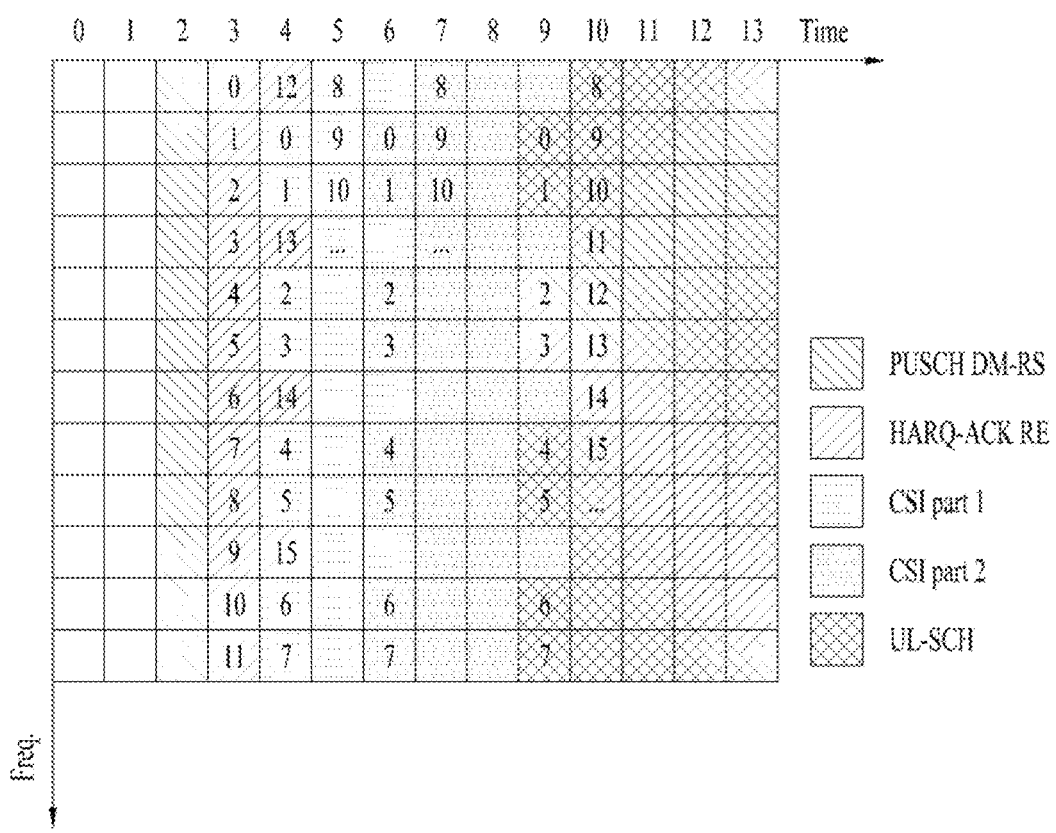
FIG. 8 illustrates exemplary multiplexing of control information in a PUSCH.

FIG. 8 illustrates exemplary multiplexing of UCI in a PUSCH. If a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 8, an HARQ-ACK and CSI are carried in a PUSCH resource.

Recently, the 3GPP standardization group has proceeded to standardize a 5G wireless communication system named new RAT (NR). The 3GPP NR system has been designed to provide a plurality of logical networks in a single physical system and support services with various requirements (e.g., eMBB, mMTC, URLLC, etc.) by changing a transmission time interval (TTI) and/or an OFDM numerology (e.g., OFDM symbol duration, SCS, and so on). In recent years, data traffic has significantly increased with the advent of smart devices. Thus, the 3GPP NR system has also considered the use of an unlicensed band for cellular communication as in license-assisted access (LAA) of the legacy 3GPP LTE system. However, unlike the LAA, a NR cell in the unlicensed-band (NR U-cell) aims to support a stand-alone operation. For example, PUCCH, PUSCH, and/or PRACH transmission may be supported in the NR UCell.

Figure 9:
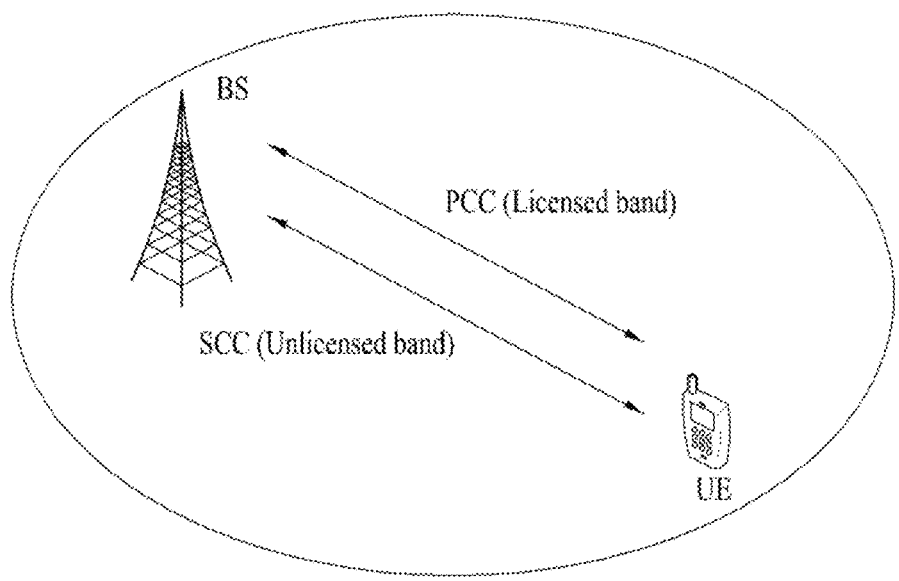
FIG. 9 illustrates a wireless communication system supporting an unlicensed band.
Figure 9:
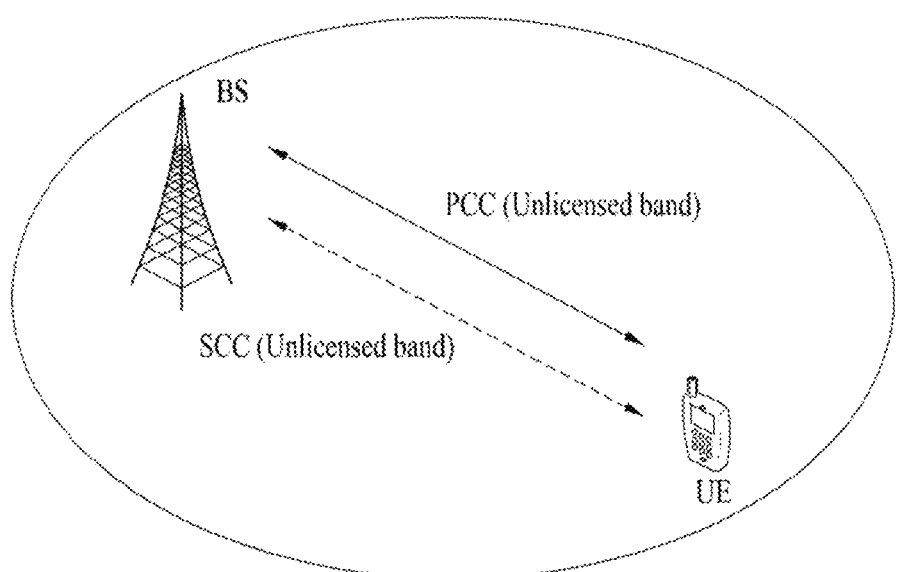

FIG. 9 illustrates an exemplary wireless communication system supporting an unlicensed band applicable to the present disclosure. In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When carrier aggregation (CA) is supported, one UE may use a plurality of aggregated cells/carriers to exchange a signal with the BS. When one UE is configured with a plurality of CCs, one CC may be set to a primary CC (PCC), and the remaining CCs may be set to secondary CCs (SCCs). Specific control information/channels (e.g., CSS PDCCH, PUCCH) may be transmitted and received only on the PCC. Data may be transmitted and received on the PCC/SCC. FIG. 9 (a) shows a case in which the UE and BS exchange signals on both the LCC and UCC (non-stand-alone (NSA) mode). In this case, the LCC and UCC may be set to the PCC and SCC, respectively. When the UE is configured with a plurality of LCCs, one specific LCC may be set to the PCC, and the remaining LCCs may be set to the SCC. FIG. 9(a) corresponds to the LAA of the 3GPP LTE system. FIG. 9(b) shows a case in which the UE and BS exchange signals on one or more UCCs with no LCC (stand-alone (SA) mode). In this case, one of the UCCs may be set to the PCC, and the remaining UCCs may be set to the SCC. Both the NSA mode and SA mode may be supported in the U-band of the 3GPP NR system.

Figure 10:
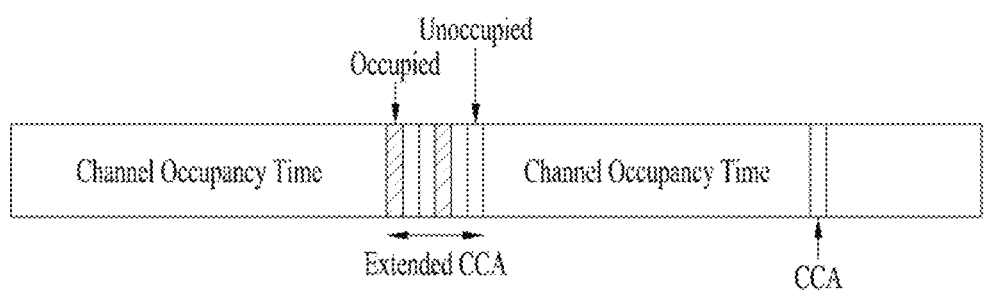
FIG. 10 illustrates an exemplary method of occupying resources in an unlicensed band.

FIG. 10 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set $q \in \{4, 5, \ldots, 32\}$ and then perform CCA for one CCA slot. When the channel is unoccupied in the first CCA slot, the communication node may secure a time period of up to $(13/32)q$ ms and transmit data in the time period. When the channel is occupied in the first CCA slot, the communication node randomly selects $N \in \{1, 2, \ldots, q\}$, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to $(13/32)q$ ms and transmit data.

Specifically, a plurality of CAP types may be defined for UL transmission in the U-band. For example, the UE may perform a Type 1 CAP or a Type 2 CAP for UL signal transmission in the U-band. In general, the UE may perform a CAP configured/indicated by the BS (e.g., Type 1 CAP or Type 2 CAP) for the UL signal transmission.

(1) Type 1 UL CAP Method

Figure 11:
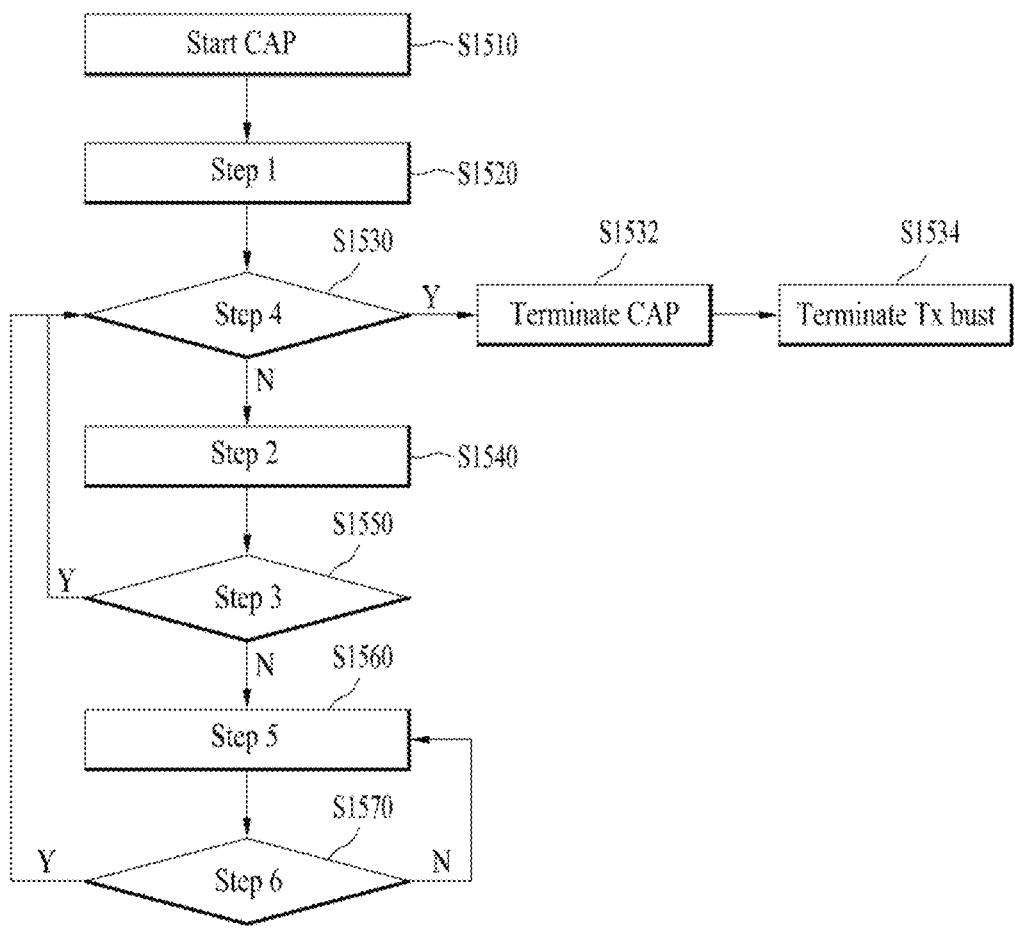
FIG. 11 is a flowchart illustrating a Type 1 channel access procedure (CAP) of a user equipment (UE) for uplink (UL) signal transmission.

FIG. 11 is a flowchart illustrating UE's Type 1 CAP operation for UL signal transmission.

To transmit a signal in the U-band, the UE may initiate a CAP (S1510). The UE may randomly select a backoff counter N within a contention window (CW) according to step 1. In this case, N is set to an initial value $N_{init}$ (S1520). $N_{init}$ may have a random value between 0 and $CW_p$. If it is determined according to step 4 that the backoff counter value (N) is 0 (YES in S1530), the UE terminates the CAP (S1532). Then, the UE may perform Tx burst transmission (S1534). If the backoff counter value is non-zero (NO in S1530), the UE decreases the backoff counter value by 1 according to step 2 (S1540). The UE checks whether the channel of U-cell(s) is idle (S1550). If the channel is idle (YES in S1550), the UE checks whether the backoff counter value is 0 (S1530). On the contrary, if the channel is not idle in S1550, that is, if the channel is busy (NO in S1550), the UE checks whether the corresponding channel is idle for a defer duration $T_d$ (longer than or equal to 25 usec), which is longer than a slot duration (e.g., 9 usec), according to step 5 (S1560). If the channel is idle for the defer duration (YES in S1570), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S1570), the UE performs step S1560 again to check whether the channel is idle for a new defer duration.

Table 6 shows that the values of $m_p$, a minimum CW, a maximum CW, a maximum channel occupancy time (MCOT), and allowed CW sizes, which are applied to the CAP, vary depending on channel access priority classes.

TABLE 6

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The size of a CW applied to the Type 1 UL CAP may be determined in various ways. For example, the CW size may be adjusted depending on whether the value of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min,p}$ for every priority class p∈{1,2,3,4}. Otherwise, the UE may increase $CW_p$ for every priority class p∈{1,2,3,4} to a next higher allowed value.

A reference subframe $n_{ref}$ (or reference slot $n_{ref}$) is determined in the following manner.

When the UE receives a UL grant in a subframe (or slot) $n_g$ and transmits a UL-SCH in subframes (or slots) $n_0$, $n_1$, ... $n_w$, starting from the subframe (or slot) no without a gap, the reference subframe (or slot) $n_{ref}$ is the subframe (or slot) no.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

Embodiments: HARQ Feedback in U-Band

To support a stand-alone operation in a U-band, a UE operation of transmitting an HARQ-ACK feedback based on a U-band PUCCH/PUSCH transmission, in response to a DL data (e.g., PDSCH) reception may be essential (hereinafter, HARQ-ACK is referred to as A/N, for convenience). A PUCCH/PUSCH is a PUCCH or a PUSCH.

The present disclosure proposes a method of transmitting an HARQ-ACK feedback (hereinafter, referred to as A/N) in a U-band. Similarly, the present disclosure may be applied to a method of transmitting other UCI (e.g., CSI or SR) on a PUCCH/PUSCH, not limited to a method of transmitting an HARQ-ACK feedback on a PUCCH/PUSCH. Further, the present disclosure is not limited to an LBT-based U-band operation, and may be applied to an L-band (or U-band) operation without LBT in a similar manner. In the following description, a plurality of CCs (CC indexes) may be replaced with a plurality of BWPs (BWP indexes) configured in one (or more) CC(s)/(serving)cell(s) or a plurality of CCs/(serving)cells including a plurality of BWPs (i.e., CC (index)-BWP (index) combinations).

The terms as used herein are defined as follows.

UCI: Control information that the UE transmits on UL.
  UCI includes a few types of control information (i.e., UCI types). For example, the UCI includes HARQ-ACK, SR, and CSI.

HARQ: Indicates whether DL data (e.g., a TB or a codeword (CW)) has been successfully received on a PDSCH. A 1-bit HARQ-ACK may be transmitted in response to a single DL data, and a 2-bit HARQ-ACK may be transmitted in response to two DL data. An HARQ-ACK response/result includes positive ACK (ACK), negative ACK (NACK), discontinuous transmission (DTX), or NACK/DTX. The term HARQ-ACK is interchangeably used with ACK/NACK, A/N, and AN.

HARQ process number/ID: Indicates the number or ID of an HARQ process. The HARQ process manages state variables related to the number of transmissions of MAC PDUs in a buffer, an HARQ feedback for a MAC PDU in the buffer, a current redundancy version, and so on.

PUCCH: A physical-layer UL channel for UCI transmission. For convenience, PUCCH resources configured and/or indicated for A/N, SR, and CSI transmissions by the BS are referred to as A/N PUCCH resources, SR PUCCH resources, and CSI PUCCH resources, respectively.

PUSCH: A physical-layer UL channel for UL data transmission.

Slot: A basic time unit (TU) or time interval for data scheduling. A slot includes a plurality of symbols. A symbol may be an OFDM-based symbol (e.g., CP-OFDM symbol or DFT-s-OFDM symbol). In the present disclosure, the terms symbol, OFDM-based symbol, OFDM symbol, CP-OFDM symbol, and DFT-s-OFDM symbol are interchangeably used.

Unless contradicting each other, each of the proposed methods described below may be applied in combination with any of the other proposed methods.

(1) HARQ-ACK Feedback Configuration/Transmission Method

A/N feedback configuration/transmission methods based on which an A/N (PUCCH/PUSCH) is transmitted, as proposed in the present disclosure, will be described below.

Figure 12:
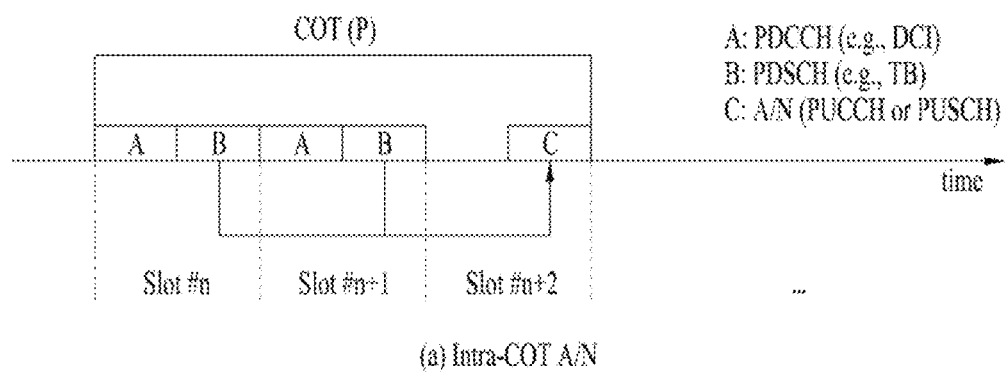
FIGS. 12 to 18 illustrate signal transmission according to the present disclosure.
Figure 12:
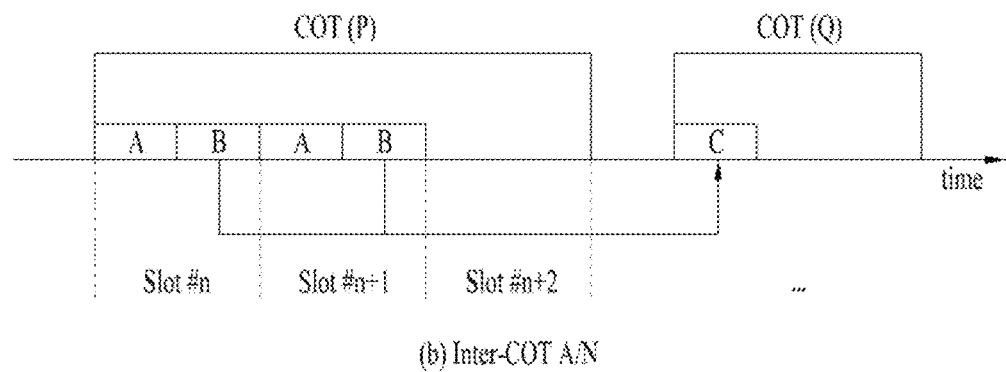

0) A/N Transmission Based on Channel Occupancy Time (COT) Configuration (FIG. 12)

A. Referring to FIG. 12(a), the BS may schedule a PDSCH transmission B to the UE in a COT period P occupied by LBT (CCA) and indicate to the UE to transmit an A/N feedback C for the PDSCH reception B in the same COT period P (or in a BS-initiated COT period starting with/occupied for a DL transmission), as indicated by reference character A (intra-COT A/N transmission). A COT is a channel occupancy time available for signal transmission, when LBT is successful. In intra-COT A/N transmission, a channel may be empty after a DL burst within a COT, which increases an HARQ-ACK transmission probability. Therefore, the UE may perform only 25-usec LBT before the UL transmission C.

B. Referring to FIG. 12(b), because of a UE processing time required for decoding a PDSCH signal and encoding an HARQ-ACK signal corresponding to the PDSCH signal, transmission of an A/N feedback C for reception B of a PDSCH scheduled/transmitted in a COT period P, in another COT period Q (or a period which does not belong to a BS-initiated COT period) following the COT period P may be indicated (inter-COT A/N transmission).

Figure 13:
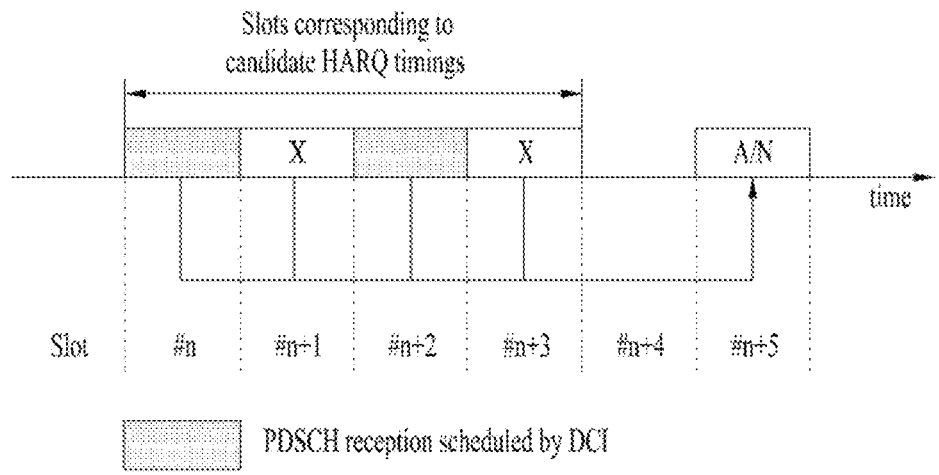
Figure 13:
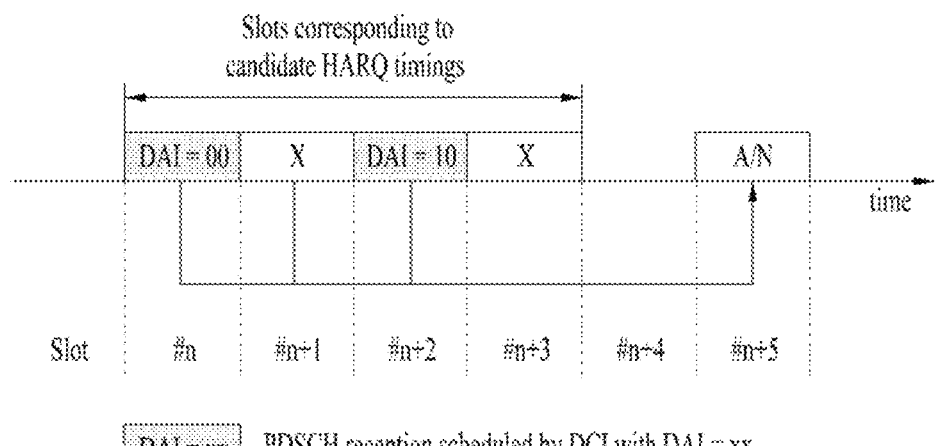

1) Timing-Based A/N Feedback Method (Hereinafter, Referred to as t-A/N Scheme) (FIG. 13)

A. After preconfiguring a plurality of candidate HARQ timings by RRC signaling, the BS may indicate one of the candidate HARQ timings to the UE by (DL grant) DCI. The UE may then operate to transmit A/N feedbacks for receptions of (a plurality of) PDSCHs in a plurality of slots corresponding to the total candidate HARQ timing set at the indicated HARQ timing. An HARQ timing is a PDSCH-to-A/N timing/interval. The HARQ timing may be represented in slots.

For example, when an A/N transmission in slot #m is indicated, A/N information may include response information for reception of a PDSCH in slot #(m-i). Slot #(m-i) is a slot corresponding to a candidate HARQ timing. FIG. 13(a) illustrates a case in which candidate HARQ timings are set to have i={2, 3, 4, 5}. In this case, when an A/N transmission timing is indicated as #(n+5)(=m), the UE may generate/transmit A/N information for PDSCHs received in slots #n to #(n+3) (i.e., A/N feedbacks for all four slots). An A/N response for the PDSCH received in slot #n+1 or slot #(n+3) may be processed as NACK.

B. In addition to an HARQ timing indication, a counter downlink assignment index (c-DAI) and/or a total DAI (t-DAI) may also be signaled by (DL grant) DCI. The c-DAI may indicate the scheduled number of a PDSCH corresponding to the (DL grant) DCI. The t-DAI may indicate the total number of PDSCHs scheduled up to the current slot (or the total number of slots carrying PDSCHs). Accordingly, the UE may operate to transmit A/Ns for PDSCHs corresponding to c-DAI values from an initial c-DAI value to the last (received) t-DAI value at an indicated HARQ timing. When a single serving cell has been configured for the UE, the c-DAI and the t-DAI may have the same meaning. Accordingly, only when there are a plurality of serving cells, the t-DAI may be included in the (DL grant) DCI. When a plurality of serving cells are configured for the UE, the c-DAI may indicate the scheduled number of a PDSCH (or the number of (a serving cell, a slot) carrying the PDSCH), which has first been counted in the cell domain and then in the time domain. Similarly, the t-DAI may indicate the total number of PDSCHs scheduled so far (up to the current slot) (or the total number of (serving cells, slots) carrying PDSCHs). The c-DAI/t-DAI may be defined based on a PDCCH. In this case, a PDSCH may be replaced by a PDCCH, and a slot carrying a PDCCH may be replaced by a PDCCH monitoring occasion in which a PDCCH (or DCI) related to the PDCCH exists, in the above description.

The c-DAI/t-DAI may be indicated in two bits. A number larger than 4 may be indicated by using a modulo operation, as follows.

When the DAI value is 00, this indicates 4n+1 (i.e., 1, 5, 9, . . . ).
When the DAI value is 01, this indicates 4n+2 (i.e., 2, 6, 10, . . . ).
When the DAI value is 10, this indicates 4n+2 (i.e., 3, 7, 11, . . . ).
When the DAI value is 11, this indicates 4n+3 (i.e., 4, 8, 12, . . . ).
n is an integer equal to or larger than 0.

FIG. 13(b) illustrates a case in which a DAI is signaled by (DL grant) DCI in the same situation as illustrated in FIG. 13(a). Referring to FIG. 13(b), a PDSCH scheduled by DCI with DAI=00 may be received in slot #n, and a PDSCH scheduled by DCI with DAI=10 may be received in slot #(n+2). In this case, the UE may generate/transmit A/N information only for receptions of three PDSCHs corresponding to consecutive DAI values (i.e., DAI=00/01/11) (hereinafter, referred to as a DAI sequence). Herein, an A/N response for the reception of the PDSCH corresponding to DAI=01 may be processed as NACK.

Figure 14:
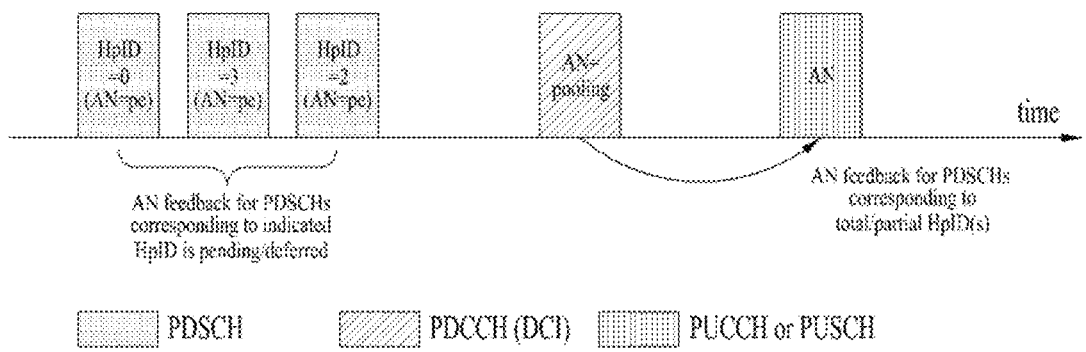

2) Pooling-Based A/N Feedback Method (Hereinafter, Referred to as p-A/N Scheme) (FIG. 14).

A. Pending/deferral of an A/N feedback transmission for a corresponding PDSCH may be indicated by DL grant DCI. Subsequently, transmission of an A/N feedback for a PDSCH corresponding to (i) total DL HARQ process IDs or (ii) some specific DL HARQ process ID(s) may be indicated by DCI (pooling). The A/N feedback may be transmitted at a timing configured/indicated by a specific signal (e.g., RRC signaling or DCI). A/N pooling may be indicated by a DL grant (e.g., DCI format 1_0/1_1), a UL grant (e.g., DCI format 0_0/0_1), or other DCI (e.g., UE(group)-common DCI). For convenience, DCI indicating A/N pooling is referred to as pooling DCI. HARQ process IDs subjected to pooling may be preconfigured/predefined or indicated by pooling DCI. A/N pooling may be indicated for the total HARQ process IDs, each group HARQ process ID, or each individual HARQ process ID.

For example, referring to FIG. 14, the UE may receive, from the BS, three PDSCHs to which HARQ process IDs (HpIDs) 0, 3 and 2 have been assigned respectively. Further, A/N pending (AN=pe) may be indicated for the three PDSCHs by DL grant DCI for each. In this case, the UE defers an A/N transmission for reception of the PDSCHs with HpID=0, 3 and 2. Then, when receiving pooling DCI (AN=pooling) from the BS, the UE may transmit A/Ns for the PDSCHs corresponding to all or a part of the HpIDs at one time.

B. When c-DAI/t-DAI signaling is configured in the t-A/N scheme (e.g., a DAI is signaled by DL grant DCI), A/N pooling may be defined as pooling of an A/N transmission for a PDSCH corresponding to an HARQ process ID (indicated by pooling DCI) or pooling of an A/N transmission for at least one PDSCH corresponding to a t-DAI value (indicated by pooling DCI). In the latter case, the UE may transmit A/N information for reception of PDSCHs corresponding to an initial c-DAI to a t-DAI value at one time.

3) Method of Dynamically Switching Between the t-A/N Scheme and the p-A/N Scheme.

A. For example, switching between the t-A/N scheme and the p-A/N scheme may be indicated by DL grant DCI. That is, which one between the t-A/N scheme and the p-A/N scheme is used to configure/transmit an A/N feedback may be indicated by DL grant DCI. Additionally, even A/N pending or A/N pooling for the p-A/N scheme may be indicated by the same DL grant DCI. For example, when the DL grant DCI indicates the p-A/N scheme, the DL grant DCI may further indicate pending or pooling of an A/N feedback transmission.

B. In another example, switching between the t-A/N scheme and A/N pending for application of the p-A/N scheme may be indicated by DL grant DCI. That is, DL grant DCI may indicate whether to apply the t-A/N scheme or pending of an A/N feedback transmission in the p-A/N scheme. Herein, A/N pooling in the p-A/N scheme may be indicated by UL grant DCI or (UE(group)-)common DCI.

C. In another example, switching between the t-A/N scheme and A/N pending for application of the p-A/N scheme may be indicated by DL grant DCI including PDSCH scheduling. That is, DL grant DCI may indicate whether to apply the t-A/N scheme or pend an AN transmission in the p-A/N scheme. Herein, A/N pooling in the p-A/N scheme may be indicated by DL grant DCI without PDSCH scheduling.

Figure 15:
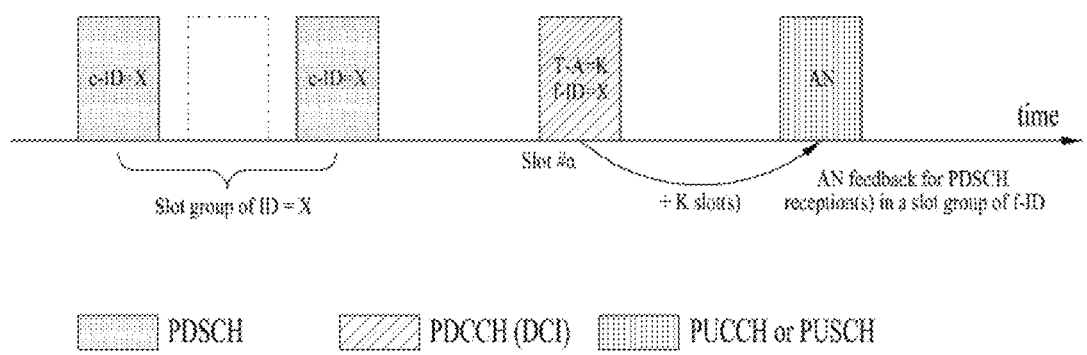

4) PDSCH (Slot) Group ID-Based A/N Feedback Method (FIG. 15)

A. A current-ID (c-ID) identifying a slot group to which a slot carrying DCI grant DCI or a corresponding PDSCH belongs may be signaled by the DCI (i.e., the DCI grant DCI). 1) An actual A/N transmission timing A and 2) a feedback-ID (f-ID) indicating the ID of a (DL PDSCH) slot group for which an A/N feedback is to be transmitted may be signaled by A/N triggering DCI. The slot group may be defined based on a plurality of (e.g., M) candidate timing sets. For example, when a candidate timing set is defined as $D\_m$ (m=0, 1, . . . , M−1), a slot group to which slot #n belongs may include M slots corresponding to slot #(n−$D\_m$) or slot #(n+$D\_m$) (m=0, 1, . . . , M). M may be predefined or indicated by the BS.

B. The UE may operate to transmit an A/N feedback for a slot group corresponding to an f-ID (a c-ID signaled/received as a value identical to the f-ID) (an A/N feedback for reception of a PDSCH in the slot group) at a time indicated as an A/N transmission timing. For example, referring to FIG. 15, A/N triggering DCI (or when the DCI is DL grant DCI, a PDSCH corresponding to the DL grant DCI) may be transmitted/detected in slot #n, indicating K and X where K is timing-A (T-A) and X is an f-ID. The UE may then transmit an A/N feedback for a PDSCH reception in a slot group corresponding to the slot group ID, X (i.e., a c-ID set to X in the DL grant DCI) in slot #(n+K). When the UE transmits the A/N feedback for the slot group corresponding to the f-ID (e.g., slot group ID=X) at a time (e.g., slot #K1) indicated as a first A/N transmission timing, a PDSCH related to a second A/N transmission timing (e.g., slot #K2) may be received in the slot group corresponding to the f-ID. In this case, the A/N response for the PDSCH reception may be set to NACK in the A/N feedback transmitted in slot #K1.

C. When A/N triggering DCI is identical to DL grant DCI (i.e., both a c-ID and an f-ID are signaled by DL grant DCI), the UE may operate to transmit 1) an A/N feedback for a bundling window corresponding to a T-A or a slot group corresponding to the c-ID (an A/N feedback for a PDSCH reception in the bundling window or the slot group) and 2) an A/N feedback for a slot group corresponding to the f-ID (a PDSCH reception in the slot group), in combination (e.g., in concatenation) (simultaneously, for example, on one PUCCH/PUSCH), at a timing indicated by the T-A.

(2) UL TX Parameter Configuration for A/N Transmission (1) Intra-COT A/N transmission or the t-A/N scheme or (2) inter-COT A/N transmission or the p-A/N scheme may be indicated by A/N triggering DCI. Accordingly, all or a part of the following UL TX parameters may be configured differently. An A/N transmission may be triggered by DL grant DCI, UL grant DCI, or common DCI.

1) Candidate HARQ Timing Set

A. When the p-A/N scheme is indicated, a minimum candidate HARQ timing may be set to a larger value, and/or the interval between adjacent candidate HARQ timings may be configured/set to be larger than when the t-A/N scheme is indicated.

2) Candidate PUCCH Starting Symbol Set or Candidate PUCCH Resource Set

A. When the p-A/N scheme is indicated, a larger number of candidate PUCCH starting symbols (or candidate PUCCH resources) may be configured than when the t-A/N scheme is indicated. For example, in the case of the p-A/N scheme, a plurality of candidate PUCCH starting symbols (or candidate PUCCH resources) may be configured, whereas in the case of the t-A/N scheme, a single PUCCH starting symbol (or PUCCH resource) may be configured. That is, more LBT opportunities may be provided for the p-A/N scheme.

3) LBT Type

A. When the p-A/N scheme is indicated, a contention window size (CWS) for back-off (BO)-based LBT may be set to a larger value than when the t-A/N scheme is indicated. For example, in the case of the p-A/N scheme, a CWS-based BO-based LBT type (e.g., Cat-4 LBT) may be configured. On the other hand, in the case of the t-A/N scheme, a BO-less LBT type may be configured. For example, in the case of the t-A/N scheme, no LBT (i.e., a UL transmission without LBT) or Cat-2 LBT (based on a short CCA gap of 25 us) may be configured.

4) A/N PUCCH Resource Set

A. When the p-A/N scheme is indicated, PUCCH resources/formats with a larger maximum supported UCI payload size may be configured/set, and PUCCH resources/formats with a larger symbol period may be configured/set than when the t-A/N scheme is indicated.

B. In addition, when the p-A/N scheme is indicated, PUCCH resources may be configured only in the form of an RB set discontinuous (e.g., in an equi-distant interlaced structure) in frequency. When the t-A/N scheme is indicated, PUCCH resources may also be configured in the form of a continuous RB set (in addition to an RB interlaced form).

C. For the above PUCCH resource allocation, each state indicated by a PUCCH resource indicator (PRI) field in DL grant DCI may be set to a different PUCCH resource structure. For example, a specific state may be set to an interlaced RB set, and another state may be set to a continuous RB set. Thus, a PUCCH resource structure may be dynamically indicated/changed by the PRI field.

5) A/N Feedback Type

A. When inter-COT A/N transmission is indicated, the p-A/N scheme may be applied, and when intra-COT A/N transmission is indicated, the t-A/N scheme may be applied.

In another method, a small CWS-based or BO-less type LBT operation is defined as LBT type A (e.g., no LBT or Cat-2 LBT), and a large CWS-based or BO-based LBT operation may be defined as LBT type B (e.g., Cat-4 LBT). In this case, when LBT type A is indicated by A/N triggering DCI, {t-A/N feedback type, candidate HARQ timing set, candidate PUCCH starting symbol set, A/N PUCCH resource set} corresponding to/configured for intra-COT A/N transmission may be applied. When LBT type B is indicated, {p-A/N feedback type, candidate HARQ timing set, candidate PUCCH starting symbol set, A/N PUCCH resource set} corresponding to/configured for inter-COT A/N transmission may be applied. Alternatively, when no LBT (hereinafter, LBT type X) is indicated by AN triggering DCI, {t-A/N feedback type, candidate HARQ timing set, candidate PUCCH starting symbol set, A/N PUCCH resource set} corresponding to/configured for intra-COT A/N transmission may be applied. When Cat-2 or Cat-4 LBT (hereinafter, LBT type Y) is indicated, {p-A/N feedback type, candidate HARQ timing set, candidate PUCCH starting symbol set, A/N PUCCH resource set}corresponding to/configured for inter-COT A/N transmission may be applied.

In another aspect, all or a part of the following UL TX parameters may be configured differently depending on whether 1) LBT type A (or LBT type X) or 2) LBT type B (or LBT type Y) is indicated by A/N triggering DCI. In the following description, LBT type A may mean LBT type A or X, and LBT type B may mean LBT type B or Y. An A/N transmission may be triggered by DL grant DCI, UL grant DCI, or common DCI.

1) Candidate HARQ Timing Set

A. When LBT type B is indicated, a minimum candidate HARQ timing may be set to a larger value, and/or the interval between adjacent candidate HARQ timings may be configured/set to be larger than when LBT type A is indicated.

2) Candidate PUCCH Starting Symbol Set or Candidate PUCCH Resource Set

A. When LBT type B is indicated, a larger number of candidate PUCCH starting symbols (or candidate PUCCH resources) may be set than when LBT type A is indicated. For example, in the case of LBT type B, a plurality of starting symbols (or candidate PUCCH resources) may be set, whereas in the case of LBT type A, a single starting symbol (or PUCCH resource) may be set. That is, more LBT opportunities may be provided for LBT type B.

3) A/N Feedback Type

A. When LBT type B is indicated, the p-A/N feedback scheme (or inter-COT A/N transmission) may be applied. When LBT type A is indicated, the t-A/N feedback scheme (or intra-COT A/N transmission) may be applied.

4) A/N PUCCH Resource Set

A. When LBT type B is indicated, PUCCH resources/formats with a larger maximum supported UCI payload size may be configured/set, and PUCCH resources/formats with a larger symbol period may be configured/set than when LBT type A is indicated.

B. In addition, when LBT type B is indicated, PUCCH resources may be configured only in the form of an RB set discontinuous (e.g., in an equi-distant interlaced structure) in frequency. When LBT type A is indicated, PUCCH resources may also be configured in the form of a continuous RB set (in addition to an RB interlaced form).

C. For the above PUCCH resource allocation, each state indicated by a PRI field in DL grant DCI may be set to a different PUCCH resource structure. For example, a specific state may be set to the interlaced RB set, and another state may be set to the continuous RB set. Thus, a PUCCH resource structure may be dynamically indicated/changed by the PRI field.

(3) UL TX Parameter Configuration for PUSCH Transmission

As an example of UL data (e.g., PUSCH) scheduling/transmission, a process of transmitting UL grant DCI that schedules a PUSCH for the UE in a COT period occupied by LBT and indicating to the UE to transmit a PUSCH in the same COT period (or a BS-initiated COT period starting with/occupied by a DL transmission) may be considered (intra-COT PUSCH transmission). As another example, a process of indicating transmission of a PUSCH corresponding to UL grant DCI transmitted in a specific COT period, in another COT period (or a period which does not belong to a BS-initiated COT period) following the COT period because of a UE processing time required for decoding a UL grant DCI signal and encoding a corresponding PUSCH signal may be considered (inter-COT PUSCH transmission).

In this situation, according to whether 1) intra-COT PUSCH transmission (for convenience, referred to as intra-COT) or 2) inter-COT PUSCH transmission (for convenience, referred to as inter-COT) is indicated by UL grant DCI, all or part of the following UL TX parameters may be configured differently.

1) Candidate HARQ (DCI-to-PUSCH) Timing Set

A. When inter-COT is indicated, a minimum candidate HARQ timing may be set to a larger value, and/or the interval between adjacent candidate HARQ timings may be configured/set to be larger than when intra-COT is indicated.

2) Candidate PUSCH Starting Symbol Set or Candidate PUSCH Resource Set

A. When inter-COT is indicated, a larger number of candidate PUSCH starting symbols (or candidate PUSCH resources) may be set than when intra-COT is indicated. For example, in the case of inter-COT, a plurality of candidate PUSCH starting symbols (or candidate PUSCH resources) may be configured, whereas in the case of intra-COT, a single PUSCH starting symbol (or PUSCH resource) may be configured. That is, more LBT opportunities may be provided for inter-COT.

3) LBT Type

A. When inter-COT is indicated, a CWS for BO-based LBT may be set to a larger value than when the intra-COT is indicated. For example, in the case of the inter-COT, a CWS-based BO-based LBT type (e.g., Cat-4 LBT) may be configured. On the other hand, in the case of intra-COT, a BO-less LBT type may be configured. For example, in the case of intra-COT, no LBT (i.e., a UL transmission without LBT) or Cat-2 LBT (based on a short CCA gap of 25 us) may be configured.

4) PUSCH Resource Allocation

A. When inter-COT is indicated, a larger (maximum) PUSCH symbol period may be configured/allocated on the time axis, and a smaller (minimum) PUSCH resource size may be configured/allocated on the frequency axis than when intra-COT is indicated.

B. In addition, when inter-COT is indicated, PUSCH resources may be configured only in the form of an RB set discontinuous (e.g., in an equi-distant interlaced structure) in frequency. When intra-COT is indicated, PUSCH resources may also be configured in the form of a continuous RB set (in addition to an RB interlaced form).

In another method, a small CWS-based or BO-less type LBT operation is defined as LBT type A (e.g., no LBT or Cat-2 LBT), and a large CWS-based or BO-based LBT operation may be defined as LBT type B (e.g., Cat-4 LBT). In this case, when LBT type A is indicated by UL grant DCI, {candidate HARQ timing set, candidate PUSCH starting symbol set, PUSCH resource allocation} corresponding to/configured for intra-COT PUSCH transmission may be applied. When LBT type B is indicated, {candidate HARQ timing set, candidate PUSCH starting symbol set, PUSCH resource allocation} corresponding to/configured for inter-COT PUSCH transmission may be applied. Alternatively, when no LBT (hereinafter, LBT type X) is indicated by UL grant DCI, {candidate HARQ timing set, candidate PUSCH starting symbol set, PUSCH resource allocation} corresponding to/configured for intra-COT PUSCH transmission may be applied. When Cat-2 or Cat-4 LBT (hereinafter, LBT type Y) is indicated, {candidate HARQ timing set, candidate PUSCH starting symbol set, PUSCH resource allocation} corresponding to/configured for inter-COT PUSCH transmission may be applied.

In another aspect, all or a part of the following UL TX parameters may be configured differently depending on whether 1) LBT type A (or LBT type X) or 2) LBT type B (or LBT type Y) is indicated by UL grant DCI. In the following description, LBT type A may mean LBT type A or X, and LBT type B may mean LBT type B or Y.

1) Candidate HARQ (DCI-to-PUSCH) Timing Set

A. When LBT type B is indicated, a minimum candidate HARQ timing may be set to a larger value, and/or the interval between adjacent candidate HARQ timings may be configured/set to be larger than when LBT type A is indicated.

2) Candidate PUSCH Starting Symbol Set or Candidate PUSCH Resource Set

A. When LBT type B is indicated, a larger number of candidate PUSCH starting symbols (or candidate PUSCH resources) may be configured than when LBT type A is indicated. For example, in the case of LBT type B, a plurality of starting symbols (or candidate PUSCH resources) may be configured, whereas in the case of LBT type A, a single starting symbol (or PUSCH resource) may A be configured. That is, more LBT opportunities may be provided for LBT type B.

3) PUSCH TX Types

A. When LBT type B is indicated, the inter-COT PUSCH transmission scheme may be applied. When LBT type A is indicated, the intra-COT PUSCH transmission scheme may be applied.

4) PUSCH Resource Allocation

A. When LBT type B is indicated, a larger (maximum) PUSCH symbol period may be configured/allocated on the time axis, and a smaller (minimum) PUSCH resource size may be configured/allocated on the frequency axis than when LBT type A is indicated.

B. Additionally, when LBT type B is indicated, PUSCH resources may be configured only in the form of an RB set discontinuous (e.g., in an equi-distant interlaced structure) in frequency. When LBT type A is indicated, PUSCH resources may also be configured in the form of a continuous RB set (in addition to an RB interlaced form).

In another method, the following method of indicating a PUSCH transmission timing and transmitting a PUSCH may be considered. A field in a PDCCH/PDSCH, indicating a UL grant (DCI)-to-PUSCH transmission (HARQ) timing is defined as a UL HARQ timing indicator (U-HTI) field, for convenience.

1) For each state of the U-HTI, a candidate PUSCH timing set including (the same number of) multiple candidate PUSCH timings (e.g., candidate PUSCH starting symbol timings) may be configured.

A. In this case, one specific (e.g., reference) U-HTI state may include minimum timings (e.g., {D1, D2, D3, D4}), and each of the other U-HTI states may be configured by adding the same offset value to the minimum timings (e.g. {D1+a, D2+a, D3+a, D4+a}). Different offset values may be set between different states. An offset may be defined in slots or symbols. The plurality of minimum timings (e.g., {D1, D2, D3, D4}) may indicate different (contiguous) slots, or a plurality of different symbol timings in each of one or more (contiguous) slots.

2) A different number of candidate PUSCH timings (within the timing set configured for each U-HTI state) may be applied according to an LBT type indicated/configured for a PUSCH transmission.

A. For LBT type B or Y, all of a plurality of candidate PUSCH timings included in a candidate PUSCH timing set may be applied. On the other hand, for LBT type A or X, only some (e.g., one) of candidate PUSCH timings in a specific (e.g., earliest) candidate PUSCH timing set may be applied.

(4) A/N Feedback Request and CWS Update Operation

An A/N feedback in the U-band may fail for various reasons in view of the nature of the unlicensed band. For example, the UE may drop/defer an A/N transmission due to LBT failure. In addition, although the UE has successfully performed an A/N transmission after LBT success, the BS may fail in A/N reception/detection. The A/N may be transmitted on a PUCCH or PUSCH (PUCCH/PUSCH). When the BS fails to receive an A/N from the UE, the BS may not identify whether the reason for the A/N reception failure is (1) LBT failure of the UE or (2) A/N reception/detection failure of the BS. In the legacy A/N feedback process in an L-band, only (2) is considered, causing no discrepancy in the A/N feedback state between the BS and the UE. However, in the U-band, both (1) and (2) are considered, and the A/N feedback state of the UE is different in the cases of (1) and (2). Accordingly, a mismatch may occur in the A/N feedback state between the BS and the UE, and an A/N error may occur, in the U-band.

For example, the UE may attempt to retransmit an A/N for previous data at the next transmission opportunity in the case of (1), while the UE may attempt to transmit an A/N for new data in the case of (2). In the case of (2), if there is no new received data, the UE may set A/N information corresponding to the new data to NACK or DTX. On the other hand, since the BS does not know whether the reason for the A/N reception failure is (1) or (2), the BS may not correctly interpret the A/N transmitted by the UE. In another example, the p-A/N scheme may be used in the U-band as described above. That is, the BS may make the UE defer the A/N transmission for the PDSCH (pending), and then indicate an A/N transmission for a PDSCH corresponding to (i) all DL HARQ process IDs, or (ii) some specific DL HARQ process ID(s) to the UE by DCI (pooling). There may be a mismatch in the A/N feedback state between the BS and the UE according to the DL HARQ process ID(s). Therefore, A/N information expected by the BS may not match A/N information actually transmitted by the UE, or an A/N codebook size expected by the BS may be different from an A/N codebook size actually transmitted by the UE.

Figure 16:
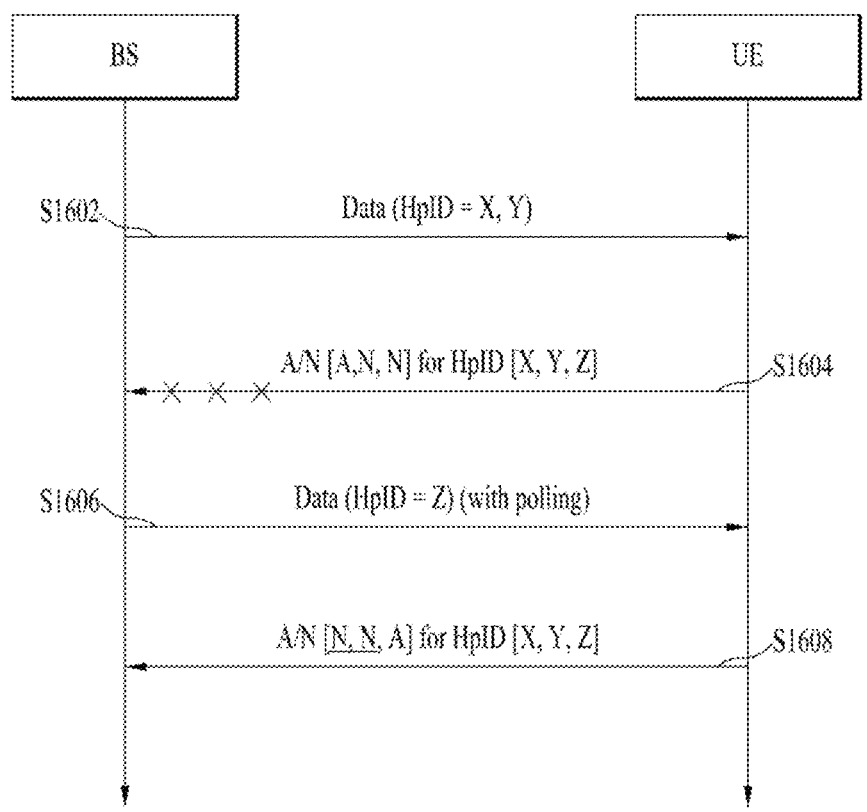

FIG. 16 illustrates A/N mismatch between a UE and a BS. Referring to FIG. 16, the UE receives data corresponding to HARQ process ID (HpID)=[X, Y] from the BS (S1602). The HpID may be indicated by DCI that schedules each data. The UE then transmits A/N feedback information to the BS (S1604). For description, it is assumed that the UE performs an A/N feedback on an HpID group basis, and HpID=[X, Y, Z] is one HpID group. In this case, A/Ns for HpID=[X, Y] may be set as ACK or NACK according to a data decoding result, and an A/N for HpID=[Z] may be set as NACK (or DTX) because there is no data received. For example, the A/Ns for HpID=[X, Y, Z] may be set to [ACK, NACK, NACK]. On the other hand, although the UE succeeds in LBT at an A/N transmission time (e.g., an A/N opportunity) and normally transmits A/N information, the BS may fail to receive the A/N information. For example, while the UE transmits A/N information on a PUCCH or a PUSCH, the BS may fail to receive the PUCCH or PUSCH.

Subsequently, the UE may receive data corresponding to HpID=[Z] from the BS (S1606). In addition, the UE may receive a request for A/N pooling from the BS. The A/N pooling request may be received in DCI that schedules data (HpID=Z) or in separate DCI (e.g., UL grant DCI or common DCI). In this case, the UE may transmit an A/N feedback for the HpID group (i.e., HpID=[X, Y, Z]) (S1608). The A/Ns for HpID=[X, Y] may be set as NACK (or DTX) because there is no data received, and the A/N for HpID=[Z] may be set as ACK or NACK according to the data decoding result. For example, the A/Ns for HpID=[X, Y, Z] may be set to [NACK, NACK, ACK]. In this case, an A/N mismatch occurs between the UE and the BS with respect to HpID= [X], which may cause unnecessary data retransmission and an error in the A/N process.

In order to solve the above-described problem, the present disclosure proposes a method of indicating information such as the following option by a 1-bit flag (hereinafter, a new feedback indicator (NFI)) in DCI. The NFI may be signaled in the form of toggling. The DCI may include AN triggering DCI. An A/N transmission may be triggered by DL grant DCI, UL grant DCI, or (UE-)common DCI.

Option 1

NFI information may indicate whether the BS has (a) succeeded or (b) failed in detecting/receiving an A/N feedback transmitted at a previous (recent) time point (hereinafter referred to as a previous A/N feedback). For example, in the case of (a), an NFI value toggled from an NFI value received in previous (recent) DCI may be indicated by current DCI. In the case of (b), an NFI value that has not been toggled from the NFI value received in the previous (recent) DCI may be indicated by the current DCI. On the contrary, (a) may be indicated by a non-toggled NFI, and (b) may also be indicated by a toggled NFL. The previous A/N feedback includes drop of the A/N feedback due to LBT failure during transmission of the UE.

Therefore, the BS may indicate to the UE that the BS has not received A/N feedback(s) ((e.g., A/N PUCCH(s)) in previous A/N opportunity(s) by a toggled NFL. Further, the BS may indicate to the UE that the BS has received the A/N feedback(s) ((e.g., A/N PUCCH(s)) in the previous A/N opportunity(s) by a non-toggled NFL. Based on an NFI in DCI, the UE may configure/transmit (a) an A/N feedback in consideration of only a data reception state after the previous A/N feedback (toggled NFI) or (b) an A/N feedback based on (the data reception state after the previous A/N feedback and the previous A/N feedback) (non-toggled NFI). For example, the UE may configure/transmit (a) an updated A/N feedback by processing the remaining A/Ns as NACK and/or DTX except for an A/N corresponding to a PDSCH scheduled after the previous A/N transmission (toggled NFI) or (b) an A/N feedback by maintaining the remaining A/Ns except for the A/N corresponding to the PDSCH scheduled after the previous A/N transmission (non-toggled NFI), based on the NFI in the DCI.

Figure 17:
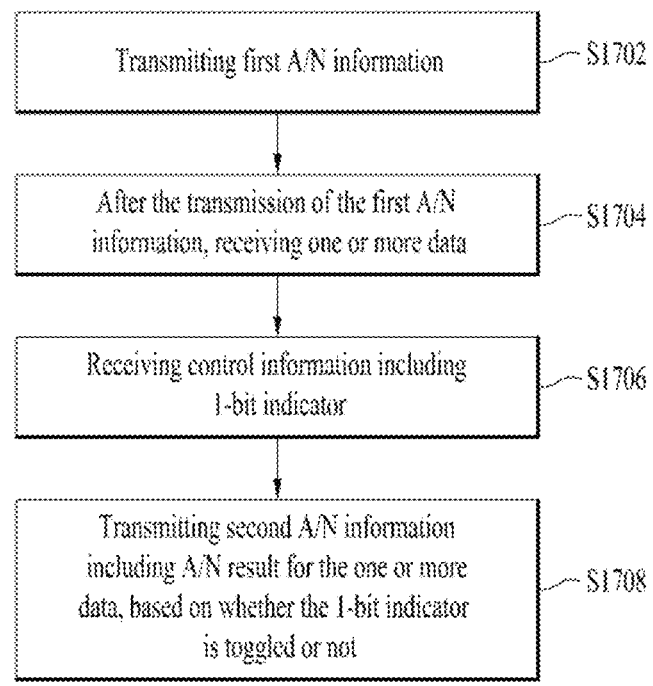

FIG. 17 illustrates an A/N feedback process according to the present disclosure. Referring to FIG. 17, the UE may transmit first A/N information (S1702). After the transmission of the first A/N information, the UE may receive one or more data (S1704). The UE may further receive downlink control information (e.g., DCI) including a 1-bit indicator (e.g., NFI) (S1706). Then, the UE may transmit second A/N information including an A/N result for the one or more data based on whether the 1-bit indicator has been toggled (S1708). Whether to transmit the first A/N information and the second A/N information may be determined according to LBT results.

Based on the 1-bit indicator having been toggled, the second A/N information may be generated by reflecting only a data reception state after the transmission of the first A/N information. In addition, based on the 1-bit indicator having not been toggled, the second A/N information may be generated in consideration of both (i) the first A/N information, and (ii) the data reception state after the transmission of the first A/N information. For example, based on the 1-bit indicator having been toggled, the remaining A/Ns may be set as NACK, except for A/Ns corresponding to the one or more data in the second A/N information. In addition, based on the 1-bit indicator having not been toggled, the remaining A/Ns may be set as the same as the first A/N information, except for the A/Ns corresponding to the one or more data in the second A/N information. The A/Ns corresponding to the one or more data may be set as ACK or NACK in the second A/N information, based on a decoding result of each data. Whether the 1-bit indicator has been toggled may be determined by comparing the value of the 1-bit indicator with the value of the 1-bit indicator set in previously received downlink control information.

Each of the first A/N information and the second A/N information may include a plurality of A/N results for the same HARQ process ID group. Also, each of the first A/N information and the second A/N information may include a plurality of A/N results for the same slot group.

Figure 18:
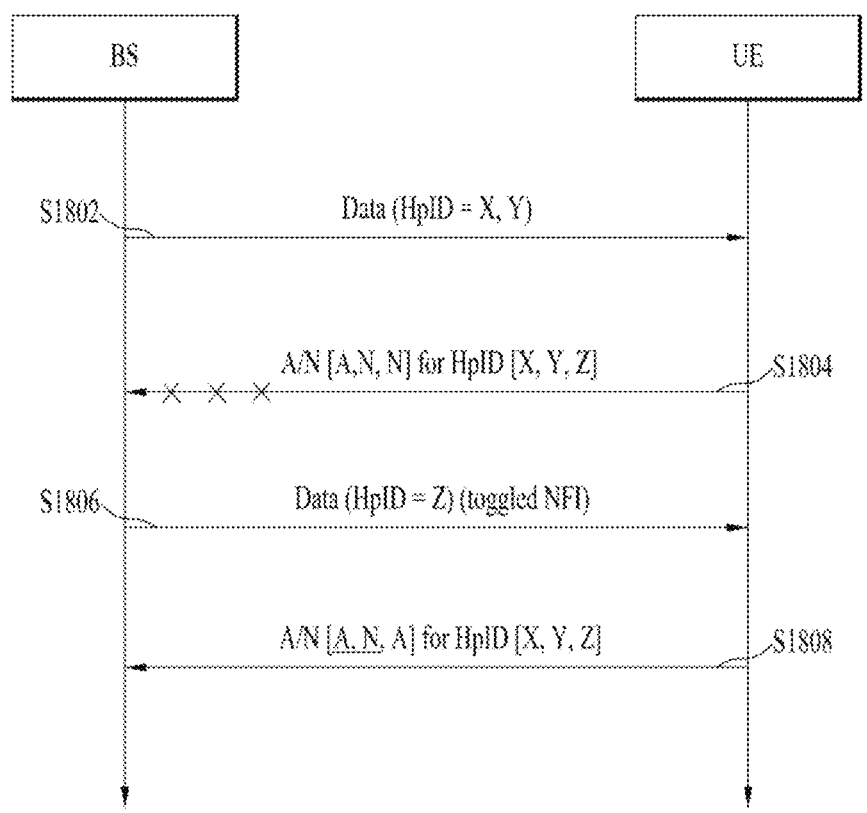

FIG. 18 illustrates an A/N feedback process according to the present disclosure. The basic situation is the same as that of FIG. 16, and for a description of steps S1802 and S1804, the description of FIG. 16 may be referred to.

Referring to FIG. 18, after steps S1802 to S1804, the UE may receive data corresponding to HpID=[Z] from the BS (S1806). The UE may receive a non-toggled NFI in DCI that schedules the data (with HpID=Z). The UE may be aware that the BS has failed to receive a previous A/N feedback (e.g., in S1804) from the non-toggled NFI, and thus perform an A/N feedback for an HpID group (i.e., HpID=[X, Y, Z]) (S1808). Specifically, A/Ns for HpID=[X, Y] may be set based on the previous A/N feedback, and an A/N for HpID=[Z] may be set as ACK or NACK according to a data decoding result. For example, A/Ns for HpID=[X, Y, Z] may be set to [ACK, NACK, ACK]. Accordingly, unnecessary data retransmission and errors in the A/N process which might otherwise be caused by an A/N mismatch between the UE and the BS may be prevented.

The NFI may be used as follows for the purpose of CWS update for a (BO-based) LBT operation required for an A/N PUCCH (or PUSCH) transmission. The CWS update operation includes CWS reset or CWS increase.

Option 2

The NFI may indicate whether (a) a CWS for an A/N PUCCH/PUSCH transmission is to be reset to a minimum value, or (b) the CWS is to be increased (by a certain unit). For example, when receiving a toggled NFI, the UE may reset the CWS for the A/N PUCCH (or PUSCH) transmission to the minimum value. When receiving a non-toggled NFI, the UE may increase the CWS value (by the certain unit). When the CWS reset operation is indicated (i.e., a toggled NFI), the UE may configure/transmit an A/N feedback in consideration of only a data reception state after a previous A/N feedback. On the other hand, when the CWS increase operation is indicated (i.e., a non-toggled NFI), the UE may configure/transmit an A/N feedback based on {the data reception state after the previous A/N feedback, and the previous A/N feedback}. For example, when the CWS reset operation is indicated (i.e., a toggled NFI), the UE may configure/transmit an updated A/N feedback by processing the remaining A/Ns as NACK and/or DTX except for an A/N corresponding to a PDSCH scheduled after the previous A/N transmission. On the other hand, when the CWS increase operation is indicated (i.e., a non-toggled NFI), the UE may configure/transmit an A/N feedback by maintaining the remaining A/Ns except for the A/N corresponding to the PDSCH scheduled after the previous A/N transmission.

The operation of updating a CWS for an A/N PUCCH/PUSCH transmission based on NFI information may be limited to a case in which the corresponding A/N PUCCH/PUSCH transmission is configured/indicated for the first/starting channel/slot of one UL TX burst. Accordingly, when the corresponding A/N PUCCH/PUSCH transmission is configured/indicated for a channel/slot other than the first/starting channel/slot within the UL TX burst, the UE may not reflect the corresponding NFI information in the CWS update (e.g., the UE may maintain the previous CWS value).

In the present disclosure, total CCs may be divided into a plurality of CC groups, and NFI information may be signaled individually/independently for each CC group. Further, total HARQ process IDs configured/defined for each CC may be divided into a plurality of HARQ process ID groups, and NFI information may be signaled individually/independently for each HARQ process ID group.

The NFI information may be signaled by any DCI that triggers an A/N transmission. That is, the NFI information may be signaled by UL grant DCI as well as DL grant DCI. For example, when the NFI information is signaled by UL grant DCI, the UE may configure an A/N feedback (payload) to be piggybacked to a PUSCH based on the NFI information. Further, it may be regulated that all of NFIs signaled by A/N triggering DCI (e.g., DL/UL grant DCI) indicating the same A/N transmission timing have the same value. Therefore, the UE may operate, assuming/expecting that A/N triggering DCIs indicating the same A/N transmission timing have the same NFI signaling/value. For example, when A/N triggering DCIs indicating the same A/N transmission timing have different NFI values, the UE may discard the A/N triggering DCIs and/or skip the A/N transmission, assuming that there are errors in the A/N triggering DCIs.

To prevent an NFI mismatch and an NFI-based A/N configuration mismatch between the UE and the BS, the UE may signal an NFI value indicated/received by/in DCI to the BS on an A/N PUCCH/PUSCH. For example, the NFI value may be signaled by a specific bit in UCI payload, by a CRC (masking) added to the UCI payload, or by scrambling/a DMRS applied to the PUSCH transmission.

With no NFI information signaling present or configured, a CWS update operation for an A/N PUCCH/PUSCH transmission may be performed based on NDI information in DL grant DCI. For example, for a PDSCH corresponding to a DL HARQ process ID scheduled/transmitted in any CC or a specific CC (e.g., PCell), an ACK may have already been fed back at a previous time. In this situation, since NDI information has not been toggled (for the same DL HARQ process ID), a PDSCH retransmission may be scheduled. The UE may then perform the CWS increase operation for an A/N PUCCH/PUSCH transmission. In the same situation, NDI information may be toggled (for the same DL HARQ process ID) so that a new PDSCH may be scheduled. In this case, the UE may perform the CWS reset operation for the A/N PUCCH/PUSCH transmission.

The operation of performing CWS update for an A/N PUCCH/PUSCH transmission based on NDI information may be limited to a case in which the A/N PUCCH/PUSCH transmission is configured/indicated for the first/starting channel/slot of a UL TX burst in the A/N PUCCH/PUSCH transmission. Accordingly, when the A/N PUCCH/PUSCH transmission is configured/indicated for a channel/slot other than the first/starting channel/slot within the UL TX burst, the UE may not reflect the corresponding NDI information in the CWS update (e.g., maintain the previous CWS value).

A plurality of CCs/BWPs may be configured for one UE. In this case, the UE may perform an NFI-based and/or NDI-based CWS operation, only for a CWS corresponding to a CC/BWP in which an A/N PUCCH/PUSCH transmission is configured/indicated.

In another method, when an A/N feedback transmission at a specific UL timing based on the p-A/N scheme is triggered (without NFI signaling), the UE may operate, not expecting (reception of) DL grant DCI(s) indicating the specific UL timing as an A/N transmission timing (and/or scheduling the initial transmission of a new TB or indicating a toggled NDI) and assuming that the DCI(s) is absent. Accordingly, upon receipt of DL grant DCI indicating the specific UL timing as an A/N transmission timing, the UE may ignore the corresponding DCI(s). The p-A/N scheme may include, for example, an A/N feedback scheme based on an HARQ process ID (group) or an A/N feedback scheme based on a PDSCH (slot) group ID.

In addition, (i) DCI triggering a t-A/N scheme-based A/N feedback and (ii) DCI triggering a p-A/N scheme-based A/N feedback may indicate the same A/N transmission timing. In this case, the UE may 1) configure/transmit only the p-A/N scheme-based A/N feedback (i.e., skip the t-AN scheme-based A/N feedback transmission), or 2) combine/configure (e.g., concatenate) and transmit the t-A/N scheme-based A/N feedback and the p-A/N scheme-based A/N feedback at the same time (on a single PUCCH/PUSCH).

In addition, (i) DCI that triggers an HARQ process ID (group)-based A/N feedback and (ii) DCI that triggers a PDSCH (slot) group ID-based A/N feedback may indicate the same A/N transmission timing. In this case, the UE may 1) configure/transmit only the HARQ process ID (group)-based A/N feedback (i.e., skip the PDSCH (slot) group ID-based A/N feedback transmission), or 2) combine/configure (e.g., concatenate) and transmit the HARQ process ID (group)-based A/N feedback and the PDSCH (slot) group ID-based A/N feedback at the same time (on a single PUCCH/PUSCH).

In another method, parameters required for an LBT operation for an initial PUCCH (including a UL channel/signal) transmission carrying UCI (e.g., an A/N) (e.g., an LBT priority class, a (maximum) CWS value, and a back-Off counter value) may be configured/indicated for/to the UE by Msg4 (e.g., a contention-resolution message) in an (initial) random access procedure. The UE may perform LBT by applying the parameters, and transmit an A/N PUCCH in response to the Msg4 reception based on the LBT. Similarly, parameters required for an LBT operation for an initial PUSCH (including a UL channel/signal) transmission (e.g., an LBT priority class, a (maximum) CWS value, and a back-off counter value) may be configured/indicated for/to the UE by an RAR in the (initial) random access procedure. The UE may perform LBT by applying the parameters, and transmit an Msg3 PUSCH based on the LBT.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 19:
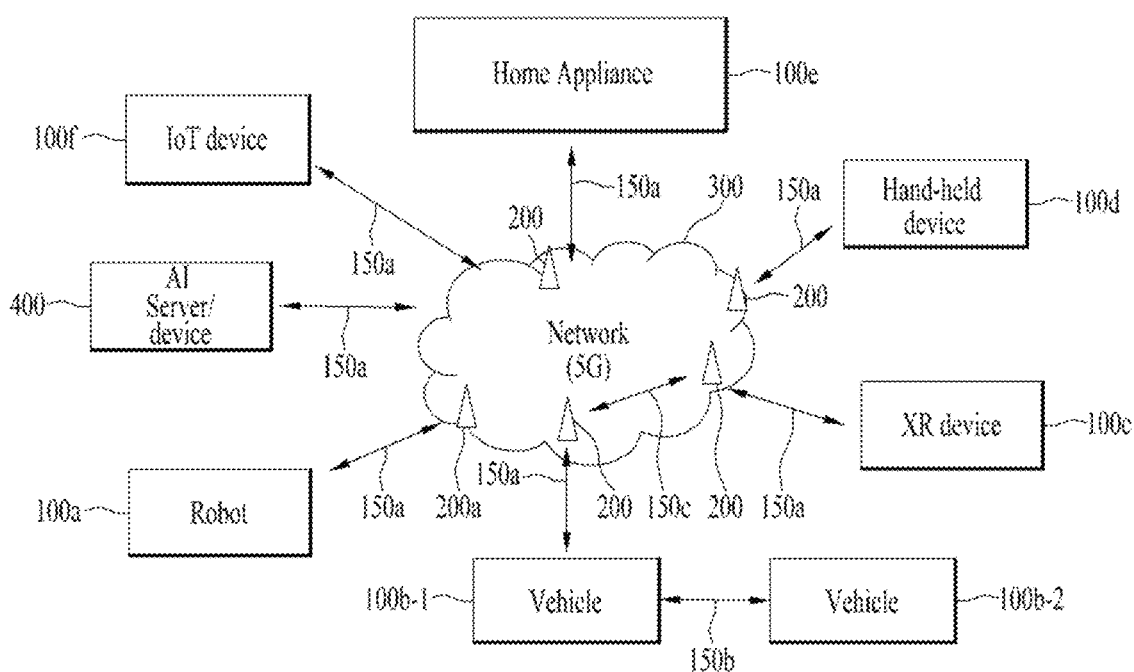
FIGS. 19 to 22 illustrate a communication system 1 applied to the present disclosure.

FIG. 19 illustrates a communication system 1 applied to the present disclosure.

Referring to FIG. 19, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 20:
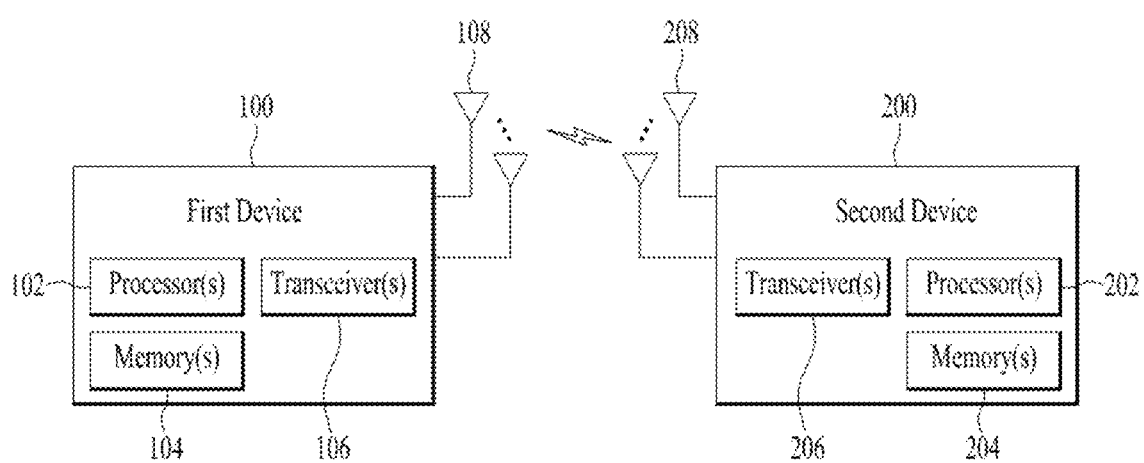

FIG. 20 illustrates wireless devices applicable to the present disclosure.

Referring to FIG. 20, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 21:
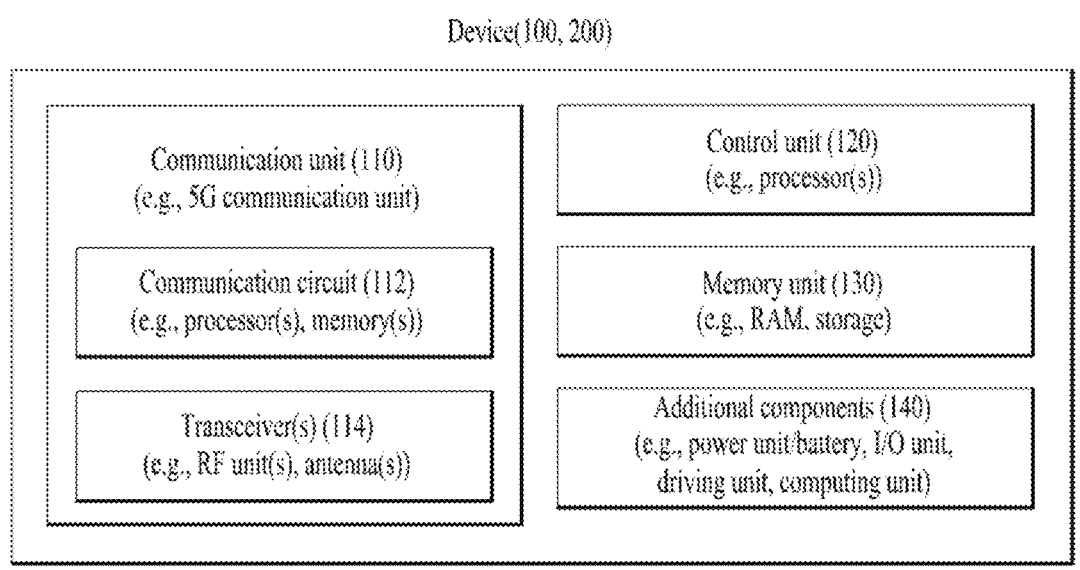

FIG. 21 illustrates another example of a wireless device applied to the present disclosure. The wireless device may be implemented in various forms according to a use case/service (refer to FIG. 19).

Referring to FIG. 21, wireless devices 100 and 200 may correspond to the wireless devices 100 and 200 of FIG. 19 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcasting terminal, a hologram device, a public safety device, an MTC device, a medical device, a FinTech device (or a finance device), a security device, a climate/environment device, the AI server/device (400 of FIG. 19), the BSs (200 of FIG. 19), a network node, or the like. The wireless device may be mobile or fixed according to a use case/service.

In FIG. 21, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 22:
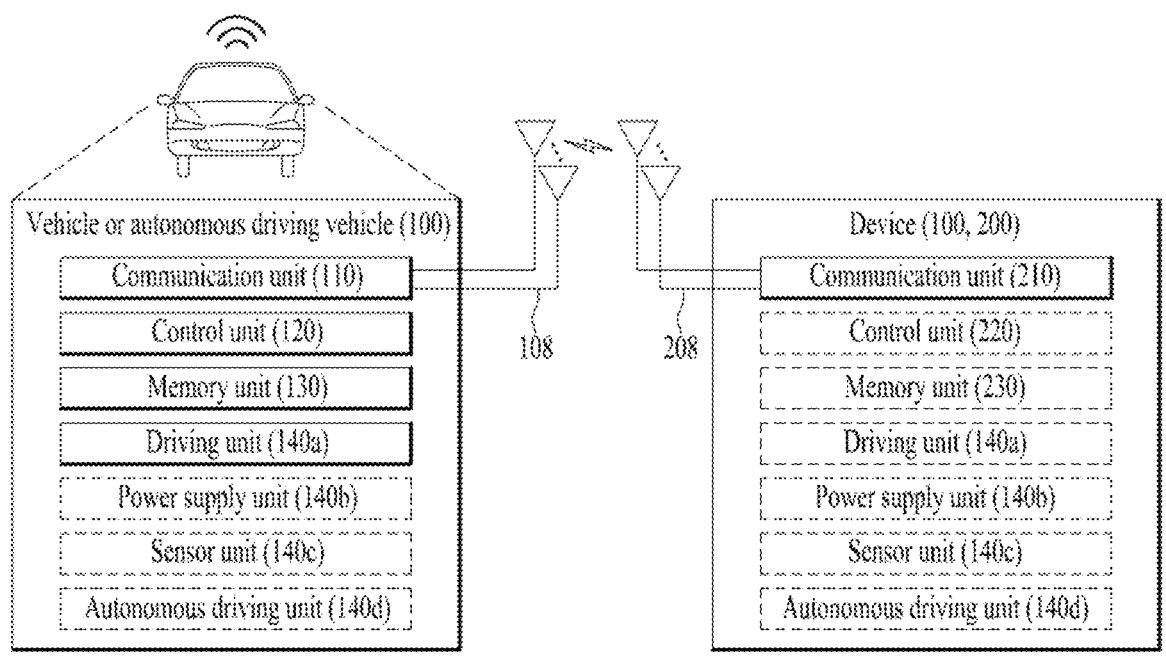

FIG. 22 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 22, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described above, focusing on the signal transmission and reception relationship between a UE and a BS. The signal transmission and reception relationship is extended to signal transmission and reception between a UE and a relay or between a BS and a relay in the same manner or a similar manner. A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, Node B, enhanced Node B (eNode B or eNB), access point, and so on. Further, the term UE may be replaced with the term terminal, mobile station (MS), mobile subscriber station (MSS), and so on.

The embodiments of the present disclosure may be achieved by various means, for example, hardware, firmware, software, or a combination thereof. In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to a UE, a BS, or other equipment in a wireless mobile communication system.

The invention claimed is:

1. A method for transmitting a signal by an apparatus in wireless communication system, the method comprising:
    receiving first Downlink Control Information (DCI) including a first New Feedback Indicator (NFI);
    receiving a first Physical Downlink Shared Channel (PDSCH) based on the first DCI;
    determining (i) first Hybrid Automatic Repeat Request-Acknowledgement (HARQ-ACK) information related to the first PDSCH and (ii) second HARQ-ACK information related to a second PDSCH scheduled by second DCI received before the reception of the first DCI; and
    transmitting a physical uplink control channel (PUCCH) including the first HARQ-ACK information and the second HARQ-ACK information,
    wherein, based on a value of the first NFI being not toggled with respect to a value of a second NFI included in the second DCI, the second HARQ-ACK information is determined as one of an Acknowledgement (NACK) and a Negative Acknowledgement (NACK) based on whether the second PDSCH is received or not, and
    wherein, based on the value of the first NFI being toggled with respect to the value of the second NFI included in the second DCI, the second HARQ-ACK information is determined as a Negative Acknowledgement (NACK) regardless of whether the second PDSCH is received or not, and
    wherein each of the first NFI and the second NFI is a 1-bit flag.

2. The method of claim 1, wherein the PUCCH is transmitted based on a result of Listen-Before-Talk (LBT) operation.

3. The method of claim 1, wherein the first HARQ-ACK information includes a bit related to the first PDSCH.

4. The method of claim 1, wherein the PUCCH includes a plurality of A/N results for a same Hybrid Automatic Repeat request (HARQ) process identification (ID) group.

5. The method of claim 1, wherein the PUCCH includes a plurality of A/N results for a same slot group.

6. An apparatus used for a wireless communication system, the apparatus comprising:
    at least one processor; and
    at least one computer memory operably connectable to the at least one processor and storing instructions that, when executed by the at least one processor, perform operations comprising:
    receiving first Downlink Control Information (DCI) including a first New Feedback Indicator (NFI);
    receiving a first Physical Downlink Shared Channel (PDSCH) based on the first DCI;
    determining (i) first Hybrid Automatic Repeat Request-Acknowledgement (HARQ-ACK) information related to the first PDSCH and (ii) second HARQ-ACK information related to a second PDSCH scheduled by second DCI received before the reception of the first DCI; and
    transmitting a physical uplink control channel (PUCCH) including the first HARQ-ACK information and the second HARQ-ACK information,
    wherein, based on a value of the first NFI being not toggled with respect to a value of a second NFI included in the second DCI, the second HARQ-ACK information is determined as one of an Acknowledgement (NACK) and a Negative Acknowledgement (NACK) based on whether the second PDSCH is received or not, and
    wherein, based on the value of the first NFI being toggled with respect to the value of the second NFI included in the second DCI, the second HARQ-ACK information is determined as a Negative Acknowledgement (NACK) regardless of whether the second PDSCH is received or not, and
    wherein each of the first NFI and the second NFI is a 1-bit flag.

7. The apparatus of claim 6, wherein the PUCCH is transmitted based on a result of Listen-Before-Talk (LBT) operation.

8. The apparatus of claim 6, wherein the first HARQ-ACK information includes a bit related to the first PDSCH.

9. The apparatus of claim 6, wherein the PUCCH includes a plurality of A/N results for a same Hybrid Automatic Repeat request (HARQ) process identification (ID) group.

10. The apparatus of claim 6, wherein the PUCCH includes a plurality of A/N results for a same slot group.

11. The apparatus of claim 6, wherein the apparatus is communicable with at least one of a user equipment (UE), a network, a base station (BS), or an autonomous driving vehicle.

* * * * *

UNITED STATES PATENT AND TRADEMARK OFFICE
CERTIFICATE OF CORRECTION

PATENT NO. : 12,160,388 B2
APPLICATION NO. : 17/265500
DATED : December 3, 2024
INVENTOR(S) : Suckchel Yang et al.

Page 1 of 1

It is certified that error appears in the above-identified patent and that said Letters Patent is hereby corrected as shown below:

In the Claims

Column 34, Line 8, Claim 1:
Delete "ment (NACK) and a Negative Acknowledgement" and insert --ment (ACK) and a Negative Acknowledgement--

Column 34, Line 54, Claim 6:
Delete "ment (NACK) and a Negative Acknowledgement" and insert --ment (ACK) and a Negative Acknowledgement--

Signed and Sealed this
Twenty-fourth Day of June, 2025

Coke Morgan Stewart
*Acting Director of the United States Patent and Trademark Office*